United States Patent

Altheimer et al.

(10) Patent No.: US 9,354,455 B2
(45) Date of Patent: May 31, 2016

(54) CONTROLLING DESIGNS USING A POLYGONAL DESIGN

(75) Inventors: Helmut Altheimer, Baisweil-Lauchdorf (DE); Wolfgang Becken, Munich (DE); Gregor Esser, Munich (DE); Dietmar Uttenweiler, Icking (DE); Andrea Welk, Munich (DE); Jochen Brosig, Zorneding (DE); Christina Butz, Munich (DE); Nadine Jung, Munich (DE); Katrin Nicke, Neuried (DE); Ilka Schwarz, Geretsried (DE); Robert Bichler, Viersen (DE); Martin Zimmermann, Erdweg-Kleinberghofen (DE); Werner Mueller, Oetisheim (DE); Hans Stetter, Munich (DE)

(73) Assignee: Rodenstock GmbH, Munich (DE)

( * ) Notice: Subject to any disclaimer, the term of this patent is extended or adjusted under 35 U.S.C. 154(b) by 1345 days.

(21) Appl. No.: 13/145,710

(22) PCT Filed: Jan. 22, 2010

(86) PCT No.: PCT/EP2010/000396
§ 371 (c)(1),
(2), (4) Date: Sep. 23, 2011

(87) PCT Pub. No.: WO2010/084019
PCT Pub. Date: Jul. 29, 2010

(65) Prior Publication Data
US 2012/0008090 A1    Jan. 12, 2012

(30) Foreign Application Priority Data
Jan. 23, 2009  (DE) .................. 10 2009 005 847

(51) Int. Cl.
*G02C 7/06*    (2006.01)
*G02C 7/02*    (2006.01)
*G02C 11/00*   (2006.01)

(52) U.S. Cl.
CPC ............... *G02C 7/066* (2013.01); *G02C 7/025* (2013.01); *G02C 7/027* (2013.01); *G02C 7/028* (2013.01); *G02C 11/10* (2013.01)

(58) Field of Classification Search
CPC .......... G02C 7/06; G02C 7/061; G02C 7/063; G02C 7/065; G02C 7/066
USPC ....................... 359/159.73–159.77
See application file for complete search history.

(56) References Cited

U.S. PATENT DOCUMENTS 6,089,713 A    7/2000  Hof et al.
6,302,540 B1 * 10/2001  Katzman et al. ......... 351/159.74
(Continued)

FOREIGN PATENT DOCUMENTS

DE    19701312 A1    7/1998
DE    10313275 A1    10/2004
(Continued)

OTHER PUBLICATIONS

English Translation of Stefanie Schuldt, "ysis-Naturliches Sehen Erleben", Deutsche Optiker Zeitung, May 1, 2004, pp. 38-43.*
(Continued)

*Primary Examiner* — Bumsuk Won
*Assistant Examiner* — William R Alexander
(74) *Attorney, Agent, or Firm* — Schiff Hardin LLP

(57) ABSTRACT

A method and device for calculating design parameters of a design of a progressive spectacle lens on the basis of a predetermined design polygon. The design parameters are calculated by specifying a point within the design polygon, in which the specified point defines the progressive spectacle lens design, and then determining a value of each design parameter at the specified point by an interpolation of at least part of the predetermined values at the corner points and, optionally, of at least part of the predetermined values of the design parameter at the at least one additional point.

24 Claims, 17 Drawing Sheets

(56) References Cited

U.S. PATENT DOCUMENTS

| | | | |
|---|---|---|---|
| 6,390,623 B1* | 5/2002 | Kokonaski et al. | 351/159.42 |
| 6,871,955 B2 | 3/2005 | Yamakaji et al. | |
| 2005/0052615 A1* | 3/2005 | Wang | G02C 7/024 351/159.52 |
| 2005/0122472 A1 | 6/2005 | Fisher et al. | |
| 2007/0132945 A1 | 6/2007 | Haser et al. | |
| 2008/0055679 A1 | 3/2008 | Yoshida | |
| 2009/0169859 A1 | 7/2009 | Biteau et al. | |

FOREIGN PATENT DOCUMENTS

| | | |
|---|---|---|
| DE | 102008015189 A1 | 10/2009 |
| DE | 102009005206 A1 | 7/2010 |
| DE | 102009005214 A1 | 7/2010 |
| EP | 0880046 A1 | 11/1998 |
| JP | 63-083884 | 4/1988 |
| JP | 01-320590 | 12/1989 |
| JP | 09-231405 | 9/1997 |
| JP | 2001-357409 A | 12/2001 |
| JP | 2003-502766 A | 1/2003 |
| JP | 2003-132096 A | 5/2003 |
| JP | 2005-513526 A | 5/2005 |
| JP | 2006-288595 A | 10/2006 |
| JP | 2008-541142 A | 11/2008 |
| JP | 2009-525498 A | 7/2009 |
| JP | 2010-517088 A | 5/2010 |
| WO | WO-01/81979 A2 | 11/2001 |
| WO | WO-03/052491 | 6/2003 |
| WO | WO-2005/009027 A1 | 1/2005 |
| WO | WO-2008/089995 A1 | 7/2008 |
| WO | WO-2008/089996 A1 | 7/2008 |
| WO | WO-2008/089998 A1 | 7/2008 |
| WO | WO-2008/089999 A1 | 7/2008 |

OTHER PUBLICATIONS

Japanese Patent Application No. 2011-546697 Office Action dated Oct. 18, 2013 (with English translation).

Stefanie Schuldt; "ysis—Natuerliches Sehen erleben"; Deutsche Optiker Zeitung, May 1, 2004, pp. 38-43.

Office Action dated Sep. 30, 2014 for Japanese Patent Application No. 2011-546697 (with English translation).

\* cited by examiner

FIG 2

| coefficients of the corner design | Sp.1 | Sp.2 | Sp.3 | Sp.4 | Sp.5 | Sp.6 | Sp.7 |
|---|---|---|---|---|---|---|---|
| design number basis | 0,0 | 30.00 | 90 | 150.00 | 210 | 270.00 | 330 |
| A1BF | 0.70 | 0.60 | 0.40 | 0.55 | 1.50 | 1.20 | 1.05 |
| A1BN | 2.50 | 2.50 | 2.50 | 2.50 | 2.50 | 2.50 | 2.50 |
| FTGW | 30.00 | 0.00 | 100.00 | 100.00 | 0.00 | 0.00 | 100.00 |
| PZGW | 50.00 | 0.00 | 0.00 | 0.00 | 0.00 | 0.00 | 100.00 |
| NTGW | 40.00 | 10.00 | 50.00 | 100.00 | 100.00 | 20.00 | 55.00 |
| DKGW | 0.00 | 0.00 | 0.00 | 0.00 | 0.00 | 0.00 | 0.00 |

FIG 4

| coefficients of the corner design | Sp.1 | Sp.2 | Sp.3 | Sp.4 | Sp.5 | Sp.6 | Sp.7 |
|---|---|---|---|---|---|---|---|
| design number basis | 0.0 | 30.00 | 90 | 150.00 | 210 | 270.00 | 330 |
| A1BF | 0.70 | 0.60 | 0.40 | 0.55 | 1.50 | 1.20 | 1.05 |
| A1BN | 2.50 | 2.50 | 2.50 | 2.50 | 2.50 | 2.50 | 2.50 |
| FTGW | 30.00 | 0.00 | 100.00 | 100.00 | 0.00 | 0.00 | 100.00 |
| P2GW | 50.00 | 0.00 | 0.00 | 0.00 | 0.00 | 0.00 | 100.00 |
| NTGW | 40.00 | 10.00 | 50.00 | 100.00 | 100.00 | 20.00 | 55.00 |
| DKGW | 0.00 | 0.00 | 0.00 | 0.00 | 0.00 | 0.00 | 0.00 |

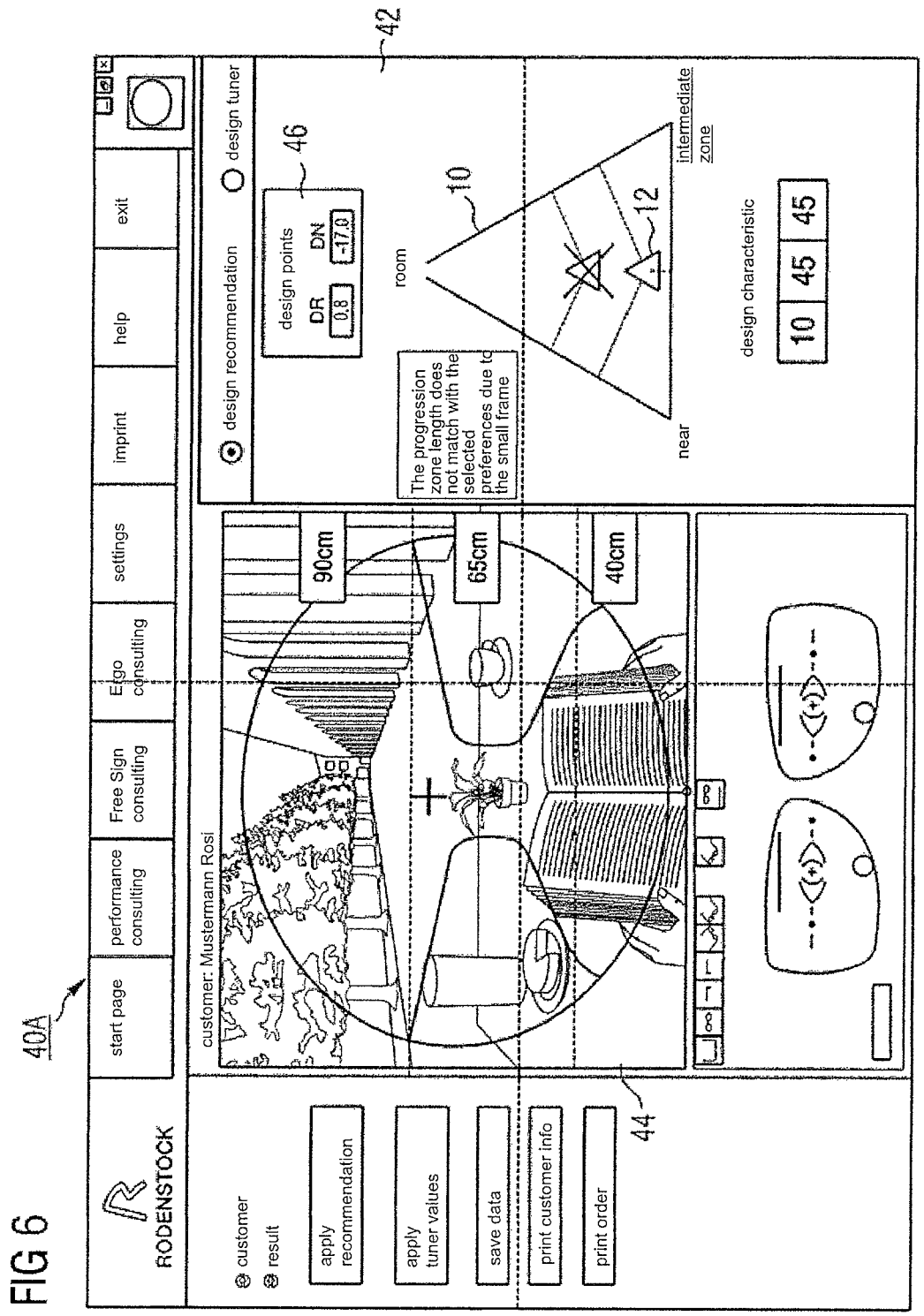

FIG 12

CONTROLLING DESIGNS USING A POLYGONAL DESIGN

The disclosure herein relates to a design control based on a predetermined design polygon.

BACKGROUND

Individual spectacle lenses, in particular progressive individual spectacle lenses, have been described in numerous patent publications, for example in DE 197 01 312, DE 103 13 275, WO 01/81979, U.S. Pat. No. 6,871,955, or EP 0 880 046. They exhibit clearly better imaging properties than conventional spectacle lenses, since the individual situation of wear of the spectacle wearer is taken into consideration in the calculation and optimization.

As a rule, progressive spectacle lenses are optimized by minimizing a target function, in which target or target values for at least one optical variable (for example astigmatism and/or refractive power) or target or desired values for at least one aberration (for example astigmatic error or astigmatic deviation and/or refractive error) of the progressive spectacle lens are taken into account. The refractive error is the difference of the refractive power of the spectacle lens and the refractive power that is determined by refraction determination. Preferably, it is values in the position of wear of the spectacle lens, i.e. taking the system spectacle lens/eye into consideration.

The target or desired values of the at least one optical property (in particular the astigmatism) or of the at least one aberration (in particular the astigmatic deviation), which are taken into account in the target function, characterize the design of a spectacle lens. In addition, the spectacle lens design can comprise a suitable object distance model. For example, the object distance model can comprise an object distance function defined as the reciprocal object distance along the principal line. A standardized object distance model is indicated in DIN 58 208 part 2 (cf. image 6), for example.

A design of a spectacle lens can be characterized by several design parameters, such as the size and in particular the position of the viewing zones (distance, near, and intermediate or progression zones). The position of the viewing zones can be specified by the principal visual points (reference points distance and near), for example, which are then taken into account as parameters of the design. Further design parameters are the maximally admissible aberrations and/or gradients of the aberrations and/or parameters characterizing the object distance model, for example.

Moreover, progressive spectacle lenses can have different designs, for example depending on the main activities and other main applications. Thus, in addition to universal progressive spectacle lenses, manufacturers often also offer progressive spectacle lenses for the computer workplace, smaller spectacle lens frame, etc.

SUMMARY

It is an object of the disclosure herein to enable a simple demonstration or visualization and determination or calculation of a design for a progressive spectacle lens for a design control.

BRIEF DESCRIPTION OF THE DRAWINGS

In the following, the disclosure herein will be exemplarily described with reference to the figures, which show:

FIG. 2 illustrates an exemplary tabular listing of the predetermined values of the design parameters;

FIG. 4 illustrates a further exemplary tabular listing of the predetermined values of the design parameters;

FIG. 5b illustrates an enlarged view of the design polygon shown in FIG. 5a;

FIGS. 6 to 8 illustrate examples of graphical user interfaces according to preferred embodiments;

FIG. 12 illustrates an example of a graphical user interface "design optimizer" (in the following referred to as "design profiler");

DETAILED DESCRIPTION

Figure 1:
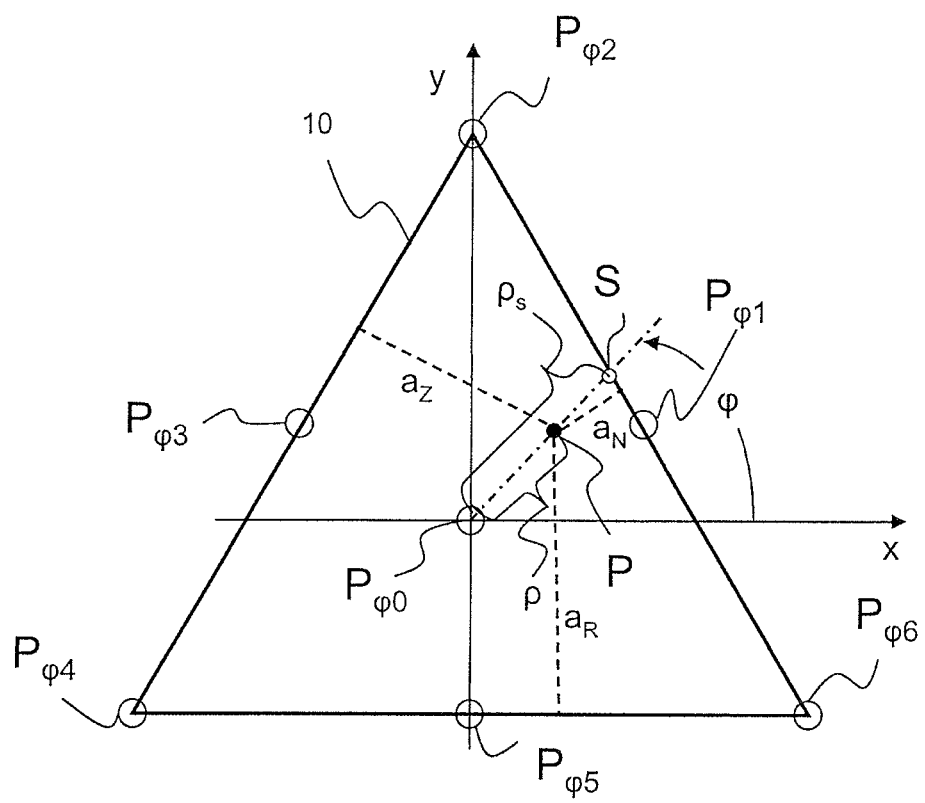
FIG. 1 illustrates an example of a design polygon according to an exemplary embodiment.

In particular, a computer-aided method for determining or calculating design parameters $D^j$, $j=1, \ldots, M$ of a design of a progressive spectacle lens on the basis of a predetermined design polygon is proposed, wherein:
  each point P within the design polygon designates or defines one design, and the design at the point P is characterized by design values $D^j(P)$ of the design parameters $D^j$;
  design values $D^j(P_{Corner})$, $j=1, \ldots, M$ of the design parameters $D^j$, which characterize the design at the respective corner points $P_{Corner}$ of the design polygon, are predetermined or predeterminable;
  optionally, values $D^j(P_{Addition})$ of the design parameters $D^j$, which characterize the design at least one additional point $P_{Addition}$ within the design polygon, are predetermined or predeterminable,
the method comprising:
  specifying a point $P_{Design}$ within the design polygon, wherein the point $P_{Design}$ defines the design to be determined;
  determining a value $D^j(P_{Design})$ of each design parameter $D^j$, $j=1, \ldots, M$, of the design to be determined at the point $P_{Design}$ by an interpolation of at least part of the predetermined values $D^j(P_{Corner})$, $j=1, \ldots, M$ at the corner points $D^j(P_{Corner}$ and optionally of at least part of the predetermined values $D^j(P_{Addition})$ of the design parameter $D^j$ at the at least one additional point $P_{Addition}$;
  and wherein M designates the number of design parameters.

The design polygon can be an N-corner in the two or three-dimensional space (for example a triangle, quadrangle, pentagon, a pyramid, etc.). The corner points $P_{Corner}$ of the design polygon can lie in one plane. The term "points within the design polygon" as defined by this application comprises all points that lie in the space enclosed by the side edges or faces of the design polygon, including all points that lie on the side edges or faces of the design polygon (i.e. all marginal points).

The mutually different corner designs at the corner points $P_{Corner}$ of the design polygon are in particular characterized by different values of at least one of the design parameters $D^j$ or have different values of at least one design parameter. The design polygon can be constructed such that along each of the sides of the design polygon, which connects two corner points of the design polygon, an at least partially continuous transition of the values of the at least one design parameter takes place. The design polygon can be an equilateral design polygon, in particular an equilateral design triangle.

The corners of the design polygon can stand for different use and/or design focuses, such as a distance zone-oriented design, near zone-oriented design, intermediate zone-oriented design, or alternatively for differently soft/hard designs.

Preferably, the interpolation is performed depending on the spatial position of the predetermined point $P_{Design}$. The closer the predetermined point in the design polygon is to a corner or a corner point, the higher is the weighting of the corner design associated with the corner point and the more strongly is the design to be calculated or defined adapted to this corner design. On the basis of the spatial position of a predetermined point within the design polygon, it is possible to determine the value of the respective design parameter by a suitable interpolation and/or weighting of the predetermined values of the at least one design parameter of the corner designs in dependence on the spatial position of the point within the design polygon. For example, the weighting of each corner design can be performed depending on the distance between the predetermined point $P_{Design}$ and the respective corner point.

In addition to the designs in the corner points (corner designs), it is also possible to optionally specify one or more further designs, which are characterized by predetermined or predeterminable values of the design parameters, at least one additional point $P_{Addition}$ within the design polygon. Thus, the interpolation can be controlled more finely, for example.

The additional point $P_{Addition}$ can be a central point, which preferably coincides with the focus of the design polygon and which defines a predetermined central or base design. The central or base design can be a design for a universal, balanced progressive spectacle lens, for example. The weighting or interpolation can then be performed taking the distance between the additional point $P_{Addition}$ (for example the central point) and the point $P_{Design}$ into consideration. The corner designs can be designs that are derived from the central or base design e.g. by variation of a parameter or several parameters. For example, the corner designs can be characterized by extreme values, which e.g. correspond to the maximally admissible deviations of one or more designs parameters of the central or base design.

Additionally or alternatively, it is possible to specify the values $D^j(P_{Addition})$ of the design parameters $D^j$, j=1 . . . M at least one additional point $P_{Addition}$ on each of the side edges of the design polygon. The weighting or interpolation can then be performed as described above taking the distance between the additional point $P_{Addition}$ and the point $P_{Design}$ into consideration.

As has been explained above, each design can be characterized by a multitude of design parameters $D^j$, j=1, . . . , M, such as the size of the viewing zones, the position of the viewing zones, the spatial position of the principal visual points (reference points distance and near), the maximally admissible aberrations and/or gradients of the aberrations, parameters that characterize the object distance model, etc. The values of the design parameters characterizing the respective design can be stored as data files and/or be stored in a database and be read out therefrom.

Each point within the design polygon defines a design for a progressive spectacle lens, which is characterized by a tuple or a set of values of the design parameters $D^j$. An advantage of the method disclosed herein is that it allows a quick and efficient calculation of a new design with a multitude of design parameters. A further advantage of the preferred method is the simple and intuitive presentation or visualization of complex characteristics of progressive designs, which is characterized by a multitude of different combinations of design parameters that are partly difficult to access for a user. Thanks to the simple and intuitive presentation of a design as a point within a design polygon, the interaction of a user (for example a designer or an optician) via a corresponding device is simplified considerably and the design finding process is eased, accelerated and improved significantly. Thus, it is possible to quickly and efficiently determine a design and a progressive spectacle lens produced or to be produced according to this design, which is optimally adapted to the individual needs of the spectacle wearer.

In addition to individual, universal progressive spectacle lenses, progressive spectacle lenses for different focuses of activity, such as sports progressive spectacle lenses, progressive spectacle lenses for work at a computer, etc., can be produced with the present method. It is also possible to calculate and produce individual room or near-vision lenses, in which the distance portion is not adapted for infinity vision, but for vision to a finite object distance. In such progressive spectacle lenses, a mid-range reference point or mid-range design point (also referred to as a design point mid-range) can be predetermined instead of a distance reference point or distance design point (also referred to as a design point distance).

Since different design variants can be produced quickly and efficiently and tested against each other using the method disclosed herein, the development and production effort for conventional, power-optimized or individual progressive spectacle lenses can be reduced significantly.

The interpolation can be an arbitrary interpolation, for example a linear, a quadrangular, a cubic, etc. interpolation.

For example, the interpolation can be a linear interpolation at least in sections. In particular, there can be specified sections in which the predetermined values are interpolated differently, wherein in each of the sections the interpolation of the predetermined design values is performed linearly, for example. A division into several sections allows a finer control of the interpolation. Preferably, the interpolation is a linear interpolation.

The design polygon can be a design triangle, which is preferably an equilateral design triangle. A design triangle enables a very simple and intuitive presentation of the characteristics of a design (as a point within the design triangle) as well as a quick and efficient determination of the values of the design parameters of the design to be determined.

According to one aspect, in addition to the values of the design parameters in the corner points of the design polygon (for example the design triangle), the values $D^j(P_{Central})$ of the design parameters $D^j$, j=1, . . . , M, which characterize the design at a central point $P_{Central}$ within the design polygon, are predetermined or predeterminable. The value $D^j(P_{Design})$ of each design parameter $D^j$ at the point $P_{Design}$ can then be calculated by an interpolation of at least part of the predetermined values $D^j(P_{Corner})$ of the design parameter $D^j$ at the corner points $P_{Corner}$ and the value $D^j(P_{Central})$ of the design parameter $D^j$ at the central point $P_{Central}$.

The interpolation (in sections) can comprise the following steps, for example:
- determining the penetration point $P_{Penetration}$ in the direction of the vector $P_{Central}P_{Design}$ of the straight line through the central point $P_{Central}$ and the point $P_{Design}$ with one of the side edges of the design polygon, wherein the vector $P_{Central}P_{Design}$ starts at the central point $P_{Central}$ and ends at the point $P_{Design}$;
- determining the two nearest points $P_{NL1}$ and $P_{NL2}$ on the side edge of the design polygon on which the penetration point $P_{Penetration}$ lies as well, in which corresponding values $D^j(P_{NL1})$ and $D^j(P_{NL2})$ of the design parameter $D^j$ are predetermined, wherein the penetration point $P_{Penetration}$ lies between the two points $P_{NL1}$ and $P_{NL2}$ on the side edge of the design polygon;
- determining the value $D^j(P_{Penetration})$ of the design parameter $D^j$ at the penetration point $P_{Penetration}$ by a first interpolation of the values of the design parameters $D^j(P_{NL1})$ und $D^j(P_{NL2})$ at the two points $P_{NL1}$ and $P_{NL2}$;
- determining the value $D^j(P_{Design})$ of the design parameter $D^j$ at the point $P_{Design}$ by a second interpolation of the determined value $D^j(P_{Penetration})$ of the design parameter $D^j$ at the penetration point $P_{Penetration}$ and the value $D^j(P_{Central})$ of the design parameter $D^j$ at the central point $P_{Central}$.

Preferably, the interpolation is performed in a polar coordinate system $\{\phi,\rho\}$, wherein the origin of the coordinate system coincides with the central point $P_{Central}$ and wherein the first interpolation is an interpolation, preferably a linear interpolation, with respect to or along the polar coordinate $\phi$, and the second interpolation is an interpolation, preferably a linear interpolation, with respect to or along the polar coordinate $\rho$.

The polar coordinate system can be an arbitrary polar coordinate system. For example, the angle $\phi$ is the angle between a straight line that passes through the central point and in parallel with one of the sides of the design polygon, and the straight line that passes through the central point and the point $P_{Design}$. The coordinate $\rho$ designates the distance of the point $P_{Design}$ from the central point.

For example, it may hold for the first interpolation:

$$D^j(P_{Penetration}) = D^j(P_{NL1}) + \frac{D^j(P_{NL2}) - D^j(P_{NL1})}{(\varphi_{NL2} - \varphi_{NL1})}(\varphi - \varphi_{NL1}).$$

For example, it may hold for the second interpolation:

$$D^j(P_{Design}) = D^j(P_{Penetration}) + \frac{D^j(P_{Central}) - D^j(P_{Penetration})}{\rho}(\rho_s - \rho_i)$$

or $$D^j(P_{Design}) = D^j(P_{Penetration}) + D^j(P_{Central}) - D^j(P_{Penetration})(1-\alpha),$$

in which:
($\phi$,$\rho$) designate the polar coordinates of the point $P_{Design}$;
($\phi_{NL1}$,$\rho_{NL1}$) and ($\phi_{NL2}$,$\rho_{NL2}$) designate the polar coordinates of the two nearest points $P_{NL1}$ and $P_{NL2}$, wherein the condition $\phi_{NL1} \leq \phi \leq \phi_{NL2}$ applies;
$\rho_S$ designates the distance of the point $P_{Penetration}$ from the central point $P_{Central}$;

$D^j(P_{NL1})$ and $D^j(P_{NL2})$ designate values of the design parameter $D^j$ at the points $P_{NL1}$ and $P_{NL2}$, respectively, wherein the points $P_{NL1}$ and $P_{NL2}$ represent the points nearest to the point $P_{Design}$, for which points the design parameters $D^j$ are predetermined; and
$D^j(P_{Central})$ designates the value of the design parameter $D^j$ in the central point $P_{Central}$.

Thus, it is possible to quickly and efficiently determine the design to be specified and to subsequently calculate or optimize and produce a spectacle lens with the determined design.

The design parameters $D^j$ can comprise one or more of the following parameters:
- weighting of the distance portion;
- weighting of the near portion;
- weighting of the progression portion;
- weighting dynamics;
- focuses of use of the spectacle lens;
- parameters specifying the position of the distance, near and/or progression portions;
- spatial position of the distance and/or near reference or design point(s);
- parameters specifying the course of the object distance function;
- parameters determining the course of one or more target isoastigmatism lines;
- maximally admissible aberrations, in particular maximally admissible refractive error, and/or maximally admissible astigmatism error, and/or maximally admissible astigmatism gradient.

Each combination of design parameters can specify a design of a progressive spectacle lens. The design (target astigmatism distribution, distribution of the target refractive power or distribution of the target refractive error, etc.), which corresponds to the respective combination of design parameters, can be calculated and stored in a database in advance, for example. However, it is also possible to automatically calculate the design (target astigmatism distribution, distribution of the target refractive power or distribution of the target refractive error, etc.) on the basis of the design parameters. The applications WO 2008/089998 and WO 2008/089995, which are each hereby incorporated by reference, describe methods and devices for obtaining and/or calculating the design parameters on the basis of collected customer data (data of the spectacle wearer). The design parameters then control the design of the spectacle lens. A method for determining or calculating a design by a transformation of a predetermined starting design in dependence on obtained individual design parameters, in particular of the spatial position of the distance and/or near reference point(s), is described in the application WO 2008/089996, which is hereby incorporated by reference.

According to one aspect of the disclosure herein, a device for determining or calculating design parameters $D^j$, j=1, ..., M of a design for a progressive spectacle lens is proposed. The device comprises:
- design polygon storage means adapted to store data of a predetermined design polygon, wherein each point P within the design polygon designates or defines one design, and the design is characterized at the point P by design values $D^j(P)$;
- design parameter calculating means adapted to perform a preferred method for determining or calculating the design parameters $D^j$, j=1 ... M of the design to be calculated on the basis of the stored, predetermined design polygon.

In particular, the design polygon storage means comprise:
corner design storage means for storing the design values $D^j(P_{Corner})$, j=1, ..., M of the design parameters that characterize the design at the respective corner point $P_{Corner}$ of the design polygon, and optionally, additional storage means for storing the values $D^j(P_{Addition})$ of the design parameters that characterize the design at least one additional point $P_{Addition}$ within the design polygon.

The design parameter calculating means can be implemented by correspondingly configured or programmed conventional computers, specialized hardware and/or computer networks or computer systems, etc. The design parameter calculating means can be in signal communication with the design polygon storage means by suitable interfaces, and in particular read out and/or modify the data stored in the design polygon storage means (comprising corner design storage means and, optionally, additional storage means). The design parameter calculating means may further comprise an interactive graphical user interface (GUI), which enables a user to interactively change the position of the design within the design polygon and/or one or more design parameters associated with a design.

According to a further aspect, a computer program product (i.e. a computer program claimed in the patent category of a device) or a storage medium with a computer program stored thereon is proposed, wherein the computer program product or the computer program is adapted, when loaded and executed on a computer, to perform a preferred method for determining or calculating the design parameters $D^j$, j= 1, ..., M of a design for a progressive spectacle lens.

According to a further aspect, a computer-aided method for determining or calculating a design for a progressive spectacle lens on the basis of a predetermined design polygon as well as corresponding computer program products and storage media are proposed, wherein:

each point P within the design polygon designates or defines one design, and the design at the point P is characterized by design values $D^j(P)$;

design values $D^j(P_{Corner})$, j=1, ..., M of the design parameters, which characterize the design at the respective corner points $P_{Corner}$ of the design polygon, are predetermined or predeterminable; and optionally, values $D^j(P_{Addition})$ of the design parameters, which characterize the design at least one additional point $P_{Addition}$ within the design polygon, are predetermined or predeterminable;

wherein the method comprises:

determining or calculating the design parameters for a progressive spectacle lens according to a preferred method for determining or calculating the design parameters of a design for a progressive spectacle lens;

calculating a design on the basis of the determined design parameters.

In particular, calculating or determining a design comprises determining or calculating spatial distributions of target values of one or more imaging properties or aberrations of the spectacle lens to be calculated, in particular the target astigmatism distribution. The distributions of the target values, which correspond to a combination of values of the design parameters, can be calculated and stored in a database in advance, for example.

As has been stated above, a method for determining or calculating a design by a transformation of a predetermined starting design in dependence on obtained individual design parameters, in particular of the spatial position of the distance and/or near reference point(s), is described in the application WO 2008/089996, for example. A further method for determining or calculating a design in dependence on design parameters, in particular a weighting of the distance and/or near portion(s), is described in DE 10 2009 005 206.2 or in DE 10 2009 005 214.3, for example, which are each hereby incorporated by reference. A transformation of a predetermined target astigmatism distribution with a base addition $Add_B$ by a multiplication with a scaling factor s is described in the patent application DE 10 2008 015 189.0.

The determined or calculated design can be a spectacle lens design for a progressive spectacle lens with an object-side or preferably eye-side progressive surface. The opposite surface can preferably be a simple spherical or rotationally symmetric aspherical surface. It is also possible to calculate or produce a design for a double-progressive spectacle lens using the above-described method.

The disclosed method for determining or calculating a design for a progressive spectacle lens is suitable both for producing a design or design variants for conventional or power-optimized progressive spectacle lenses and for producing designs or design variants for individually optimized progressive spectacle lenses.

The method for determining or calculating a design for a progressive spectacle lens can further comprise modifying the determined design, wherein modifying is preferably performed interactively in a dialogue with a user and/or automatically on the basis of individual data and/or preferences of a spectacle wearer. The calculated design can further be transformed and/or scaled, for example to change the position of the design or reference points and/or to adapt the object distances in the design or reference points. Moreover, limits can be set to the possible and/or desired design modification in advance.

Further, the method can comprise visualizing the spatial position of the modified design within the design polygon. This can be achieved by suitable graphical user interfaces, for example.

A further aspect of the disclosure herein relates to a device for determining or calculating a design for a progressive spectacle lens, comprising:

design polygon storage means for storing data of a predetermined design polygon, wherein each point P within the design polygon designates or defines one design, and the design is characterized at the point P by design values $D^j(P)$;

wherein the design polygon storage means comprise:
corner design storage means for storing the design values $D^j(P_{Corner})$, j=1, ..., M of the design parameters that characterize the design at the respective corner point $P_{Corner}$ of the design polygon, and optionally, additional storage means for storing the values $D^j(P_{Addition})$ of the design parameters that characterize the design at least one additional point $P_{Addition}$ within the design polygon;

design calculating means adapted to calculate a design for the progressive spectacle lens according to a preferred method for producing or calculating a design for a progressive spectacle lens.

Further, the design calculating means comprise design parameter calculating means, which are adapted to perform a preferred method for determining or calculating the design parameters $D^j$, j=1 ... M of the design to be calculated on the basis of the stored, predetermined design polygon. The design calculating means are preferably adapted to calculate a design for the progressive spectacle lens according to a preferred method for producing or calculating a design for a progressive spectacle lens in dependence on the determined or calculated design parameters.

The design calculating means and the design parameter calculating means can be implemented by suitably configured or programmed computers, specialized hardware and/or computer networks or computer systems, etc.

A further aspect of the disclosure relates to a computer-aided method for producing a progressive spectacle lens, comprising:
  determining or calculating a design for a progressive spectacle lens according to a preferred method for determining or calculating a design for a progressive spectacle lens on the basis of a predetermined design polygon;
  calculating or optimizing the spectacle lens on the basis of the calculated spectacle lens design.

Calculating or optimizing the spectacle lens can comprise minimizing the target function:

$$F(\vec{x}) = \sum_{i=1}^{m} [g_{i,Ast}(Ast_i - Ast_{i,Target})^2 + \ldots]$$

wherein
$Ast_{i,Target}$ is the target value of the local astigmatic deviation or the local astigmatic error at the $i^{th}$ evaluation point;
$Ast_i$ is the actual value of the local astigmatic deviation or the local astigmatic error at the $i^{th}$ evaluation point;
$g_{i,Ast}$ is the local weighing of the astigmatic deviation or the local astigmatic error at the $i^{th}$ evaluation point.

Further preferably, the refractive error $\Delta R$ is also taken into account in the target function, so that calculating or optimizing the spectacle lens comprises minimizing the target function:

$$F(\vec{x}) = \sum_{i=1}^{m} [g_{i,\Delta R}(\Delta R_i - \Delta R_{i,Target})^2 + g_{i,Ast}(Ast_i - Ast_{i,Target})^2 + \ldots]$$

wherein
$\Delta R_{i,Target}$ is the target value of the local refractive error at the $i^{th}$ evaluation point;
$\Delta R_i$ is the actual value of the local refractive error at the $i^{th}$ evaluation point;
$g_{i,\Delta R}$ is the local weighing of the refractive error at the $i^{th}$ evaluation point.

In the above formula, $Ast_{i,Target}$ designates the local astigmatic deviation $Ast_{i,Target}$, which is assigned to the previously calculated design for a progressive spectacle lens, and $\Delta R_{i,Target}$ designates the target value of the local refractive error $\Delta R_{i,Target}$ which is assigned to the previously calculated design for a progressive spectacle lens.

The calculation or optimization of the spectacle lens can be performed taking individual data of the spectacle wearer into account. The individual data of the spectacle wearer can comprise individual parameters of the spectacle wearer and/or individual parameters of the position of wear of the spectacle lens or the spectacles in front of the eyes of the spectacle wearer. The average or individual parameters of the spectacle wearer and/or of the position of wear of the spectacle lens can in particular comprise the pupillary distance (PD), the corneal vertex distance (CVD), the forward inclination (FI), the face form angle (FFA), etc.

The calculation or optimization of the spectacle lens can further comprises providing surface data of the calculated spectacle lens, in particular providing surface data of the at least one progressive surface of the spectacle lens. The method for producing a progressive spectacle lens can further comprise a step of manufacturing or finishing the spectacle lens on the basis of the surface data. The manufacture can be performed by CNC machines, casting methods, a combination of the two methods, or using other suitable methods.

According to one aspect of the disclosure, a device for producing a progressive spectacle lens is proposed, comprising:
  design calculating means adapted to calculate a design for the progressive spectacle lens according to the one preferred method for producing or calculating a progressive spectacle lens design; and
  optimizing or calculating means adapted to perform a calculation or optimization of the spectacle lens on the basis of the calculated design.

The optimizing or calculating means for optimizing a spectacle lens and the design calculating means can be implemented by suitably configured or programmed computers, specialized hardware and/or computer networks or computer systems, etc. It is possible for the same computer or the same computer system to be configured or programmed such as to perform both the calculation of the design for the spectacle lens and the calculation or optimization of the spectacle lens on the basis of the calculated design. However, it is of course possible for the calculation of the design and the calculation of the spectacle lens on the basis of the calculated design to be performed in separate computing units, for example in separate computers or computer systems. The optimizing or calculating means can be in signal communication with storage means, which store individual data of the spectacle wearer in a temporary or permanent fashion.

Further, the device for producing a progressive spectacle lens can comprise machining means for finishing the spectacle lens. The machining means can be CNC-controlled machines, for example, for direct machining of a blank on the basis of the determined optimization specifications. Preferably, the finished spectacle lens has a simple spherical surface or rotationally symmetric aspherical surface and a progressive surface optimized on the basis of the design specifications, calculated according to the method disclosed herein, and individual data of the spectacle wearer. Preferably, the spherical or rotationally symmetric aspherical surface is the front surface (i.e. the object-side surface) of the spectacle lens. However, it is of course possible to provide the surface, which has been optimized on the basis of the calculated design, as the front surface of the spectacle lens. It is also possible for both surfaces of the spectacle lens to be progressive surfaces.

The device for producing a progressive spectacle lens can also comprise obtaining means for obtaining individual data of the spectacle wearer. The obtaining means can in particular comprise graphical user interfaces.

Further, a computer program product and a storage medium with a computer program stored thereon are proposed, wherein the computer program product or the computer program is adapted, when loaded and executed on a computer, to perform a method for calculating and optimizing a progressive spectacle lens, the method comprising the following steps:
  calculating a design for the progressive spectacle lens according to a preferred method for producing or calculating a progressive spectacle lens design;
  calculating or optimizing the progressive spectacle lens on the basis of the calculated design.

As has been explained above, the use of a design polygon enables a simple and intuitive presentation or visualization of complex characteristics of progressive designs, which is characterized by a multitude of different combinations of design parameters that are partly difficult to access for a user.

According to an aspect of the disclosure herein, a computer-aided method for visualizing a design for a progressive spectacle lens on the basis of a predetermined design polygon as well as corresponding computer program products and storage media are proposed, wherein:

each point P within the design polygon designates or defines one design, and the design at the point P is characterized by design values $D^j(P)$;

design values $D^j(P_{Corner})$, j=1, ..., M of the design parameters, which characterize the design at the respective corner points $P_{Corner}$ of the design polygon, are predetermined or predeterminable;

optionally, values $D^j(P_{Addition})$ of the design parameters, which characterize the design at least one additional point $P_{Addition}$ within the design polygon, are predetermined or predeterminable, and wherein the method comprises:

specifying design parameters or values of the design parameters of the design to be visualized;

determining the spatial position of a point $P_{Design}$ within the design polygon, which corresponds to the predetermined combination of design parameters or the values of the design parameters of the design to be visualized;

visualizing the spatial position of the determined point $P_{Design}$, which defines the design, within the design polygon.

The visualization of the spatial position of the determined point $P_{Design}$ can be performed by suitable, preferably interactive, graphical user interfaces (GUI). Thanks to the simple and intuitive presentation of a design as a point within a design polygon, the interaction of a user (for example a designer or an optician) via a corresponding device is simplified considerably and the design finding process is eased, accelerated and improved significantly.

The method for visualizing a design for a progressive spectacle lens can further a comprise a step of deciding, depending on the visualized spatial position of the determined point $P_{Design}$ of the design, whether the design can be accepted without modification or whether the design has to be modified.

Further, the method for visualizing a design for a progressive spectacle lens can comprise modifying one or more design parameters, determining the spatial position of a point $P'_{Design}$ within the design polygon, which corresponds to the modified combination of design parameters or of the values of the modified design parameters, and visualizing the spatial position of the determined point $P'_{Design}$, which defines the modified design, within the design polygon.

The design parameters of the design to be visualized can comprise weightings $g_n$, n=1, ..., N of each of the designs in the corner points $P_{Corner}$. The vertical distances $a_n$, n=1, ..., N of the point to be determined $P_{Design}$ from the respective side edge of the design polygon can be calculated according to the formula:

$$a_n = \frac{k}{\sum_{n=1}^{N} g_n} g_n, n = 1 \ldots N$$

wherein:
k is a predetermined number and preferably k=100 holds.

Also, according to a further aspect, a device for visualizing a design for a progressive spectacle lens is proposed, comprising:

design polygon storage means for storing data of a predetermined design polygon, wherein each point P within the design polygon designates or defines one design, and the design is characterized at the point P by design values $D^j(P)$;

wherein the design polygon storage means comprise:

corner design storage means for storing the design values $D^j(P_{Corner})$, j=1, ..., M of the design parameters that characterize the design at the respective corner point $P_{Corner}$ of the design polygon, and optionally, additional storage means for storing the values $D^j(P_{Addition})$ of the design parameters that characterize the design at least one additional point $P_{Addition}$ within the design polygon;

at least one design parameter input portion adapted to input design parameters or values of the design parameters of the design to be visualized;

calculating means adapted to determine the spatial position of a point $P_{Design}$ within the design polygon, wherein the point $P_{Design}$ corresponds to the predetermined combination of design parameters or of the values of the design parameters of the design to be visualized;

at least one display portion adapted to visualize the calculated position of the determined point $P_{Design}$ within the design polygon.

Further provided is a graphical user interface for visualizing a design for a progressive spectacle lens, wherein the design is visualized as a point within a predetermined design polygon, comprising:

at least one design parameter input portion adapted to input design parameters or values of the design parameters of the design to be visualized;

at least one design polygon display portion adapted to visualize the spatial position of a point $P_{Design}$ within a predetermined design polygon, wherein the point $P_{Design}$ corresponds to the predetermined combination of design parameters or the values of the design parameters of the design to be visualized;

each point P within the design polygon designates or defines one design, and the design at the point P is characterized by design values $D^j(P)$, design values $D^j(P_{Corner})$, j=1, ..., M of the design parameters, which characterize the design at the respective corner points $P_{Corner}$ of the design polygon, are predetermined or predeterminable;

optionally, the values $D^j(P_{Addition})$ of the design parameters, which characterize the design at least one additional point $P_{Addition}$ within the design polygon, are predetermined or predeterminable.

Further advantages and features of the present disclosure will be described by way of example in the following with reference to the accompanying drawings of preferred embodiments. It is reiterated that features shown with reference to separate embodiments can be combined with each other in an arbitrary manner to form new embodiments.

A simple but very impressive method of design visualization and design variation taking into account at least three selected focuses of activity can be performed on the basis of the position of a point in a preferably equilateral triangle, the design triangle.

FIG. 1 shows such a design triangle by way of example. In FIG. 1:

The point $P=P(x,x)=P_{Design}$ designates an arbitrary point within the design triangle 10, at which the values of the design parameters are to be determined;

the point $S=S(x_S,y_S)=P_{Penetration}$ designates the point of intersection of the straight line, which passes through the central point $P_{\phi 0}=P_{\phi 0}(0,0)$ and the point $P=P(x,y)$, in the direction of the vector $P_{\phi 0}P$ and of the side edge of the design polygon 10, wherein the point $P_{\phi 0}$ indicates the start and the point $P=P(x,y)$ indicates the end of the vector $P_{\phi 0}P$;

$P_{\phi 0}=P_{Central}=(0,0)$ designates the central point of the design polygon 10;

the points $P_{\phi 2}=P_{\phi 2}(x_2,y_2)$, $P_{\phi 4}=P_{\phi 4}(x_4,y_4)$, $P_{\phi 6}=P_{\phi 6}(x_6,y_6)$ designate the respective corner point ($P_{Corner1}$, $P_{Corner2}$, $P_{Corner3}$)) of the design polygon; and the points $P_{\phi 1}=P_{\phi 1}(x_1,y_1)$, $P_{\phi 3}=P_{\phi 3}(x_3,y_3)$, $P_{\phi 5}=P_{\phi 5}(x_5,y_5)$ designate the respective additional point ($P_{Addition1}$, $P_{Addition2}$, $P_{Addition3}$)) at which the values of the parameters of the respective design are predetermined.

In FIG. 1, the point $P_{\phi 0}=P_{\phi 0}(0,0)$ coincides with the origin of the coordinate system {x,y} and with the priority of the design polygon 10. The axis "x" of the coordinate system is parallel to one of the side edges of the design polygon 10, in the present case parallel to the side edge $P_{\phi 4}P_{\phi 6}$. The axis "y" is perpendicular to the axis "x". The central point is assigned a base design with a predetermined design parameter "$D^j$", wherein j is an integer from 1 to M.

The angle $\phi$ is the angle between the vector from the central point $P_{\phi 0}(0,0)$, which matches with the triangle midpoint, for example, to an arbitrary point P within the design polygon of the X axis. The distance $\rho$ is the distance between the central point and the point P. The characteristic $\alpha$ is the ratio of the distance between the central point $P_{\phi 0}$ and the point P, and the distance ($\rho_S$) between the central point and the point of intersection S. If the characteristic is $\alpha=0$, the point P is in the center, i.e. coincides with the central point $P_{\phi 0}$. If the characteristic is $\alpha=1$, the point is on the triangle side or on the side edge of the design polygon 10.

Like in the embodiment shown in FIG. 1, the points $P_{\phi 1}$ to $P_{\phi 6}$ (also referred to as edge or boundary points) can be on an equilateral triangle, wherein this is not considered a necessary characteristic. The points can also describe a general N-corner, so that a design N-corner is defined instead of the design polygon.

Starting from the central point $P_{\phi 0}$, each of the edge or boundary points point $P_{\phi 1}$ to $P_{\phi 6}$ is assigned exactly one value of the considered design parameter "D". If D designates an arbitrary design parameter of the base design, then $D(P_{\phi 0})$ to $D(P_{\phi 6})$ designate the associated design parameter in the points $P_{\phi 0}$ to $P_{\phi 6}$. The values $D(P_{\phi 1})$ to $D(P_{\phi 6})$ for the edge or boundary points $P_{\phi 1}$ to $P_{\phi 6}$ can be specified directly. From these points, the value of the design parameter D can be calculated for an arbitrary point $P=P(x,y)$ by simple interpolation routines.

The simplest interpolation is the linear interpolation. An exemplary linear interpolation can be performed as follows:

First of all, the two edge or boundary points of the design triangle 10 are determined, which span a triangle segment with the central point $P_{\phi 0}$, within which the point P lies. In FIG. 1, these are the points $P_{\phi 0}$, $P_{\phi 1}$ and $P_{\phi 2}$. Stated differently, first of all the sector of the design triangle, which is defined by the central point $P_{\phi 0}$ and two of the edge or boundary points $P_{\phi 1}$ to $P_{\phi 6}$ and in which the point P lies, is sought. If one imagines plotting the associated design values as a third coordinate (z direction, perpendicular to the drawing plane of FIG. 1) at these points, then a plane is spanned thereby. The value in the z direction, which belongs to the coordinates of $P(x,y)$, then is the design value that is assigned to the point P.

For example, this can be achieved by performing a linear interpolation twice at least in sections, the steps being:

1) Calculating the polar coordinates of the point P. This are the polar coordinates $\phi$, $\rho$
2) Calculating the polar coordinates of the edge points $P_{\phi 1}$ to $P_{\phi 6}$: $\phi_1, \ldots, \phi_6$.
3) Looking between which predetermined values $\phi_i$ and $\phi_{i+1}$ the angle $\phi$ lies: $\phi_i \leq \phi < \phi_{i+1}$, wherein $\phi_i$ and $\phi_{i+1}$ designate the angular coordinates of the two edge points $P_{\phi i}$ and $P_{\phi i+1}$ that are closest to point S. Put differently, this step comprises determining the two closest points $P_{NL1}$ ($=P_{\phi i}$) and $P_{NL2}$ ($=P_{\phi i+1}$) on the side edge of the design polygon, on which the penetration point $P_{Penetration}$ lies.
4) Calculating the value of the design parameter $D_S$ at the edge or boundary point S:

$$D_S = D_i + \frac{D_{i+1}-D_i}{\varphi_{i+1}-\varphi_i}(\varphi - \varphi_i).$$

5) Calculating the characteristic $$\alpha = \frac{\rho}{\rho_S}.$$

6) Calculating the value of the design parameter D at the point P by a linear interpolation according to $\rho$ or $\alpha$ $$D_P = D_S + \frac{D_0 - D_S}{\rho_S}(\rho_S - \rho) = D_S + (D_0 - D_S)(1-\alpha).$$

In the above formulae:

$D_0=D(P_{\phi 0})$ designates the value of the parameter D in the central point $P_{\phi 0}=(0,0)$;

$D_i=D(P_{\phi i})$ and $D_{i+1}=D(P_{\phi i+1})$ each designate values of the parameter D in the two determined edge or boundary points that are closest to the point S;

$D_S=D(S)$ designates the determined value of the parameter D in the point S;

$D_P=D(P)$ designates the value of the parameter D in the point P.

The values of the other design parameters can be determined in the same way.

The corners of the design triangle 10 can represent different focuses of use and design. For example, one of the corner points can define a room design, one of the corner points can define an intermediate zone-oriented design (for example a design for a computer workplace), and one of the corner points can define a design with the focus on near vision (reading, watchmaker, etc.).

The closer the point in the design triangle 10 is to a corner, the higher the weighting of this focus of application or design is and the more strongly the design to be determined is adapted to the focus of application or design. In the following, R designates a room design, Z an intermediate zone-oriented design, N for the focus on near vision or for a near zone-oriented design.

Naturally, the focuses of design can also represent other variables, such as a hard design, a soft design, a dynamic design, etc., or other focuses of activity.

Generally, it is true for a point in the equilateral triangle that the sum of the vertical distances from the triangle sides is a constant:

$$a_R + a_Z + a_N = K = \text{constant}.$$

These distances can simply be taken into account for the design weighting of the opposite corners. Advantageously, one sets K=100. Then, the lengths of the lines $a_R$, $a_Z$, and $a_N$ automatically correspond to the percentage weightings of the respective design corners. The three percentage weightings can then be combined to form a six-digit design number. This allows the corresponding spectacle lens to be identified and ordered with only one single number, the so-called design number.

The design number can be defined as follows:
The first two digits, i.e. the hundred thousand's place and the ten thousand's place, constitute the weighting room $a_R$, the next to digits, i.e. the thousand's place and the hundred's place, constitute the weighting intermediate zone $a_Z$, and the last to digits, i.e. the ten's place and the one's place, constitute the weighting near $a_N$.

Accordingly, the design number 224731 means: $a_R$=22, $a_Z$=47 and $a_N$=31.

As has been described above, the automatic design modification is suitably performed depending on the position of the point in the design triangle 10 by an interpolation of the predetermined values of the design parameters or of the predetermined design-defining lens sizes.

Starting from a specific base or starting design produced for the respective product type (universal progressive spectacle lens, indoor lens), the spectacle lens designer can set the limits to the possible or desired lens modification. These limits then determine the values of the design parameters in the corner points.

Parameters of a design or the design-defining lens sizes are listed in the following table 1:

TABLE 1

| | |
|---|---|
| $A_1$(BF) | reciprocal object distance in the reference point distance |
| $A_1$(BN) | reciprocal object distance in the reference point near |
| $g_{FT}$ | distance portion weighting (0-100) |
| $g_{NT}$ | near portion weighting (0-100) |
| $g_{PZ}$ | weighting prog. zone (0-100), Gaussian maximum of $A_1$ |
| DkGW | dynamics weight (0-100), |
| dDF | ΔDF vertical position of the design point distance |
| dDN | ΔDN vertical position of the design point near |
| etc. | |

For at least the three corners of the design triangle, advantageously also for one intermediate point each on the triangle sides, the values of the design parameters shown in FIG. 2 or FIG. 4 are listed in tabular form for one design each.

In column 1 (col. 1) in FIGS. 2 and 4, values of the design parameters in the central point (or for the central design) are indicated, in columns 2 to 7 (col. 2 to col. 7), the values of the design parameters in the predetermined edge or boundary points on the side edges of the design triangle 10 are indicated. The angular coordinate φ of the respective edge or boundary point is indicated in the first row of the table (cf. Row design number basis.

In FIGS. 2 and 4:
A1BF designates the reciprocal object distance in the reference point distance;
A2BN designates the reciprocal object distance in the reference point near;
FTGW designates the distance portion weighting (value 0 to 100);
PZGW designates the weighting of the progression or intermediate zone;
NTGW designates the near portion weighting (values 0 to 100);
DkGW designates the weighting dynamics.

The design parameters can also comprise further parameters. These parameters can comprise parameters, for example, that directly or indirectly characterize the object distance model and/or the course of the principal line and/or the position of the design or reference points for near and/or distance.

The values of the design parameters or the determination variables are specified for the selected designs at the corners and possibly also intermediate values on the triangle sides, which do not have to be the medians. Then, an interpolation of the specified design parameters or determination variables is performed twice for an arbitrary point in the design triangle 10.

The specification and the later two-dimensional interpolation can be for two of the three distances $a_R$, $a_Z$, and $a_N$. Since the sum of the three distances is constant in the equilateral triangle, there are only two independent variables. Preferably, however, the interpolation is performed in the two variables angle φ and characteristic α, as has been described above.

The first interpolation is performed according to the angle φ, and the second interpolation according to the characteristic α. A continuous design transition is obtained thereby.

Figure 3:
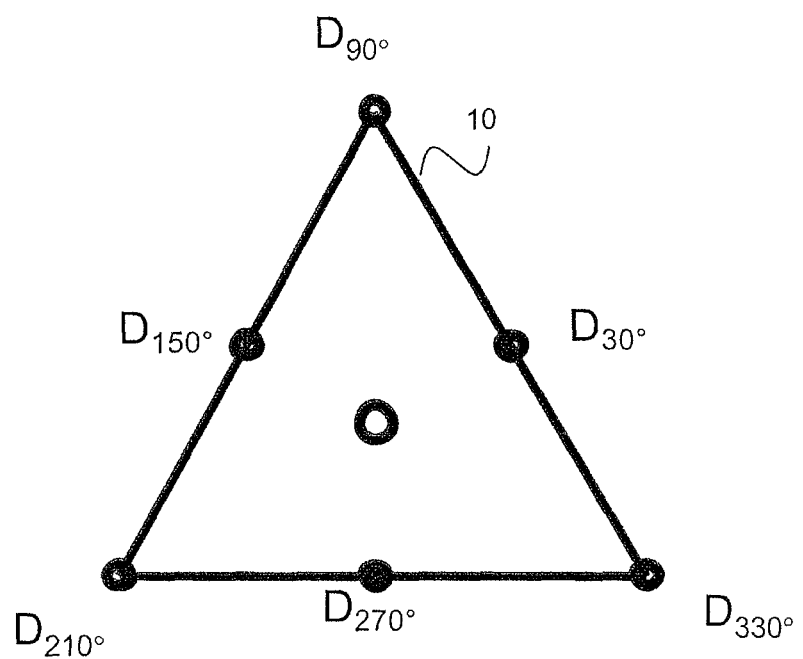
FIG. 3 illustrates a further example of a design polygon according to an exemplary embodiment.

FIG. 3 exemplarily shows a two-dimensional design interpolation by a design triangle. D designates a design parameter in the respective point of the design triangle 10.

7 designs are deposited. The center of the design triangle defines or determines a balanced design, the corners of the design triangle three corner designs, and the medians of the design triangle three transitional designs. Each point within the design triangle is then assigned a different design.

The transitions are made smooth by a linear interpolation of the design coefficients in polar coordinates, which is performed twice.

For the design in the center of the design triangle, the values of the design parameters can be stored directly in a starting design file. The values of the parameters of the six boundary designs, i.e. of the three corner designs and the three transitional designs, can be derived from the values of the design parameters. In this case, only the modification coefficients are required. Alternatively, the values of the parameters of the six boundary designs can be stored directly in the starting design file.

Figure 5A:
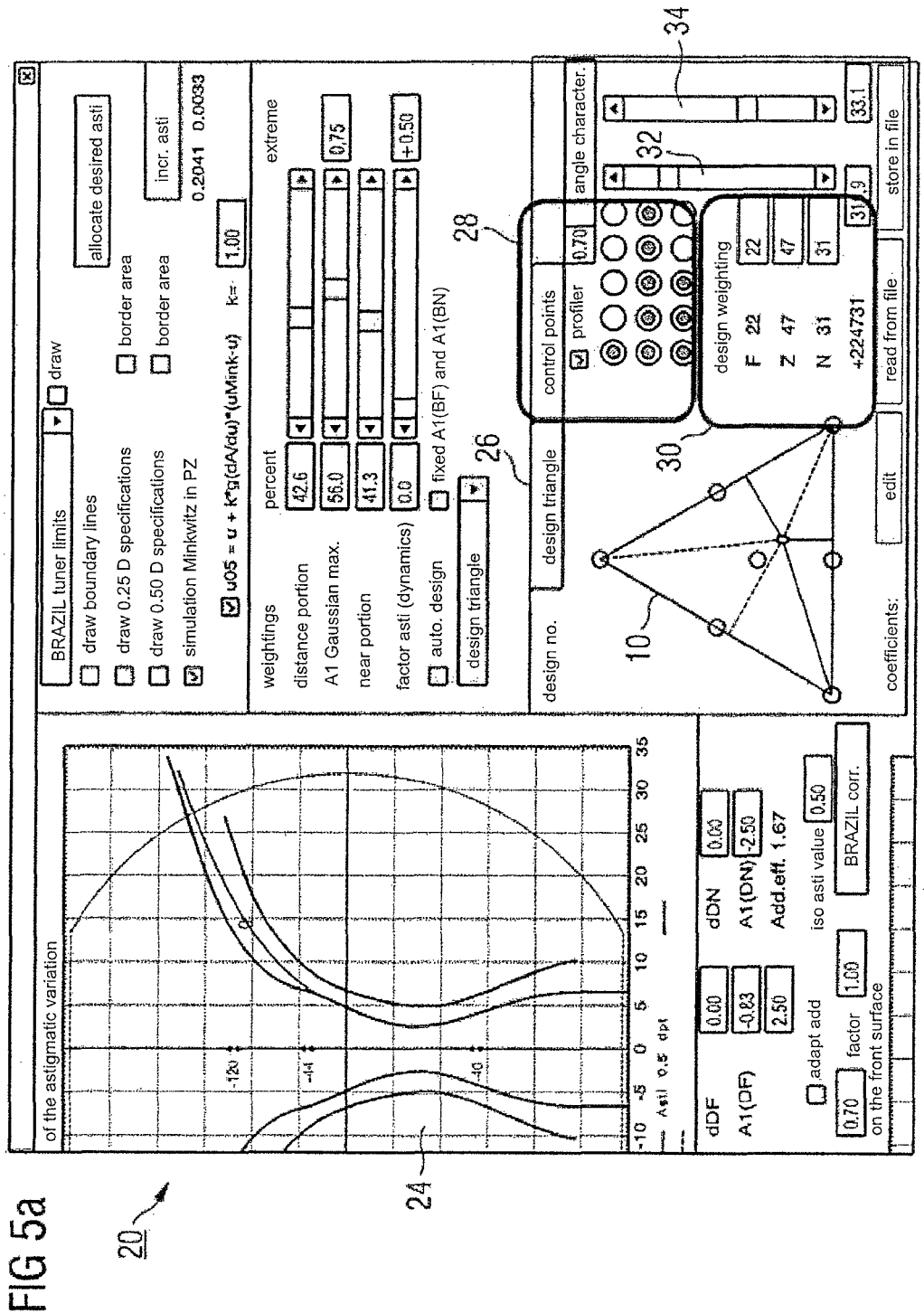
FIG. 5a illustrates an example of a graphical user interface for visualizing a design polygon and optionally modifying the design, which is assigned to a point within the design polygon.
Figure 5B:
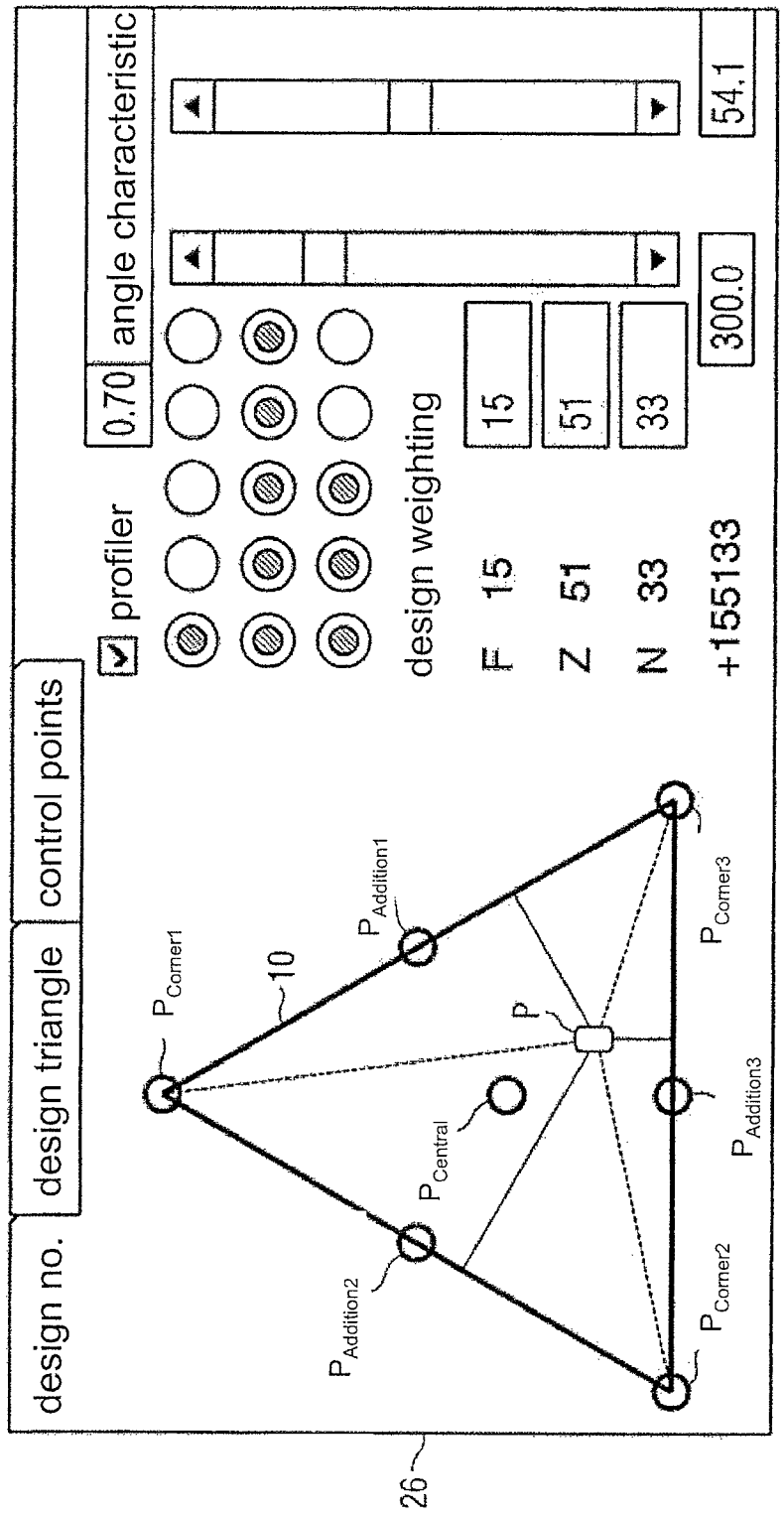

FIG. 5a shows an example of a graphical user interface 20 for visualizing a design triangle and optionally modifying the design, which is assigned to a point within the design triangle. FIG. 5b shows an enlarged view of the graphical user interface 20 with the design triangle shown in FIG. 5a.

The graphical user interface 20 comprises a first display portion 22 and a second display portion 24.

The first display portion 22 comprises several sub-portions. In the first sub-portion 26 (design triangle display sub-portion), the calculated position of the determined point P=P (x,y)=$P_{Design}$ within the design triangle 10 is visualized. In addition to the design corner points $P_{Corner1}$, $P_{Corner2}$ and $P_{Corner3}$, also three additional points $P_{Addition1}$, $P_{Addition2}$, and $P_{Addition3}$ as well as one central point $P_{Central}$, on which the values of the design parameters $D^i$ are specified, are visualized. The position of the point P within the design triangle 10 can be changed actively by the user. The corresponding design parameters in the new position of the point P are automatically calculated and displayed then.

Moreover, the first display portion 22 is adapted to display and optionally modify (interactively) values of the design parameters of the design that is visualized or to be visualized. The first display portion further comprises:
- a sub-portion 28 adapted to display an optionally modify an allocation of points in the "design profiler" (see FIG. 12);
- a sub-portion 30 adapted to display the weightings of the corner design (or of the designs assigned to the points $P_{Corner1}$, $P_{Corner2}$ and $P_{Corner3}$) and the six-digit design number. In the concrete example, the weightings of the distance, intermediate, and near zones are 15, 51 and 34, respectively. The six-digit design number accordingly reads 155134;
- a sub-portion 32 adapted to display the angle $\phi$ (also referred to as a design angle);
- a sub-portion 34 adapted to display the characteristic a (also referred to as a design characteristic).

The second display portion 24 is adapted to (schematically) visualize the design assigned to the point P or the combination of design parameters in the point P. In the concrete embodiment, the course of the 0.5 D target isoastigmatism line of the target astigmatism distribution of the design corresponding to point P is shown. In addition, the variation limits of the course of the 0.5 D target isoastigmatism line can be shown. It is also possible to display or visualize other design characteristics (for example distribution of the astigmatic error, the refractive error, or other optical properties, the visus, etc.).

The graphical user interface 20 can have further portions or sub-portions adapted to input, visualize and/or modify other parameters of the calculated design.

Figure 7:
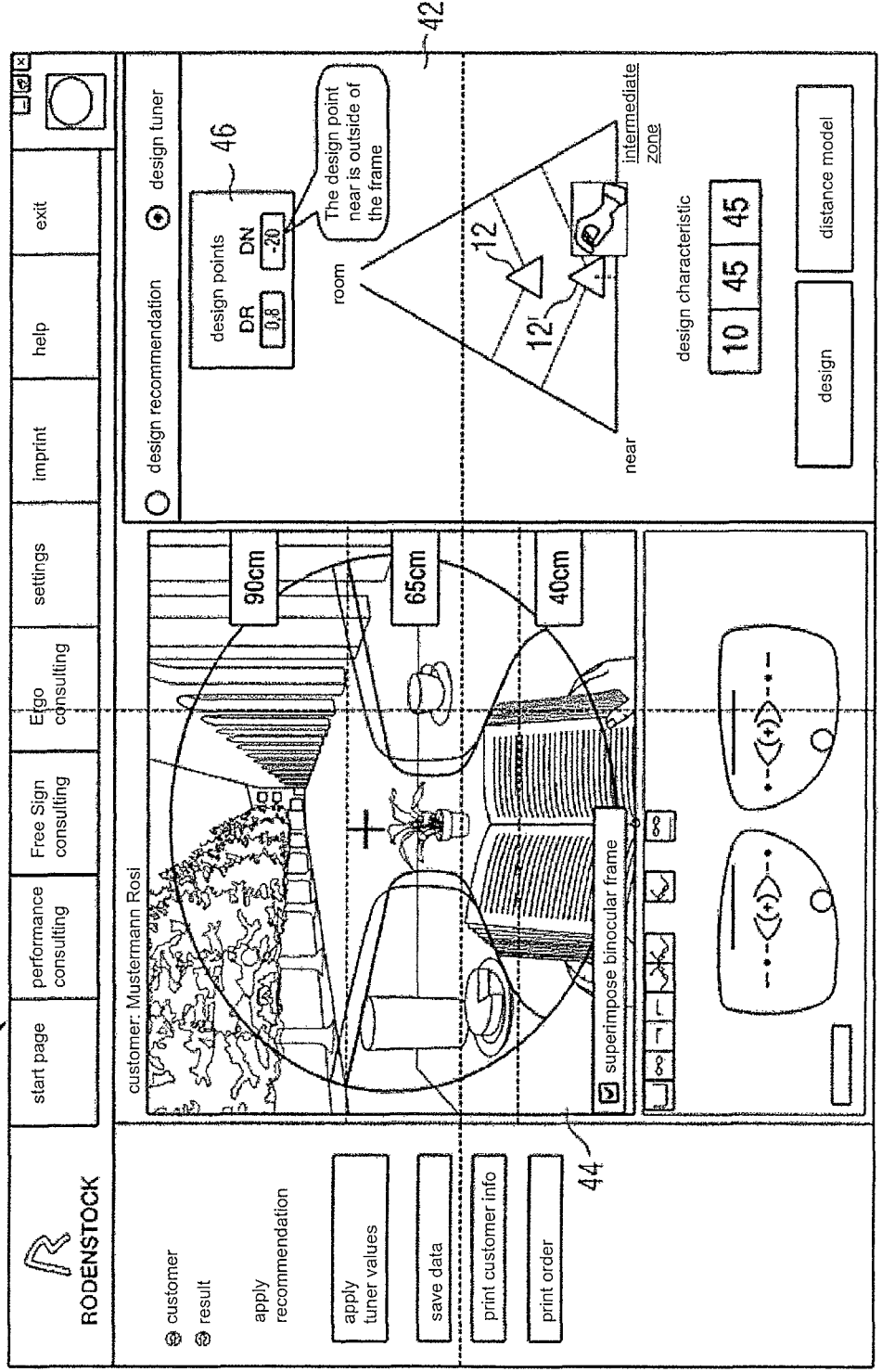
Figure 8:
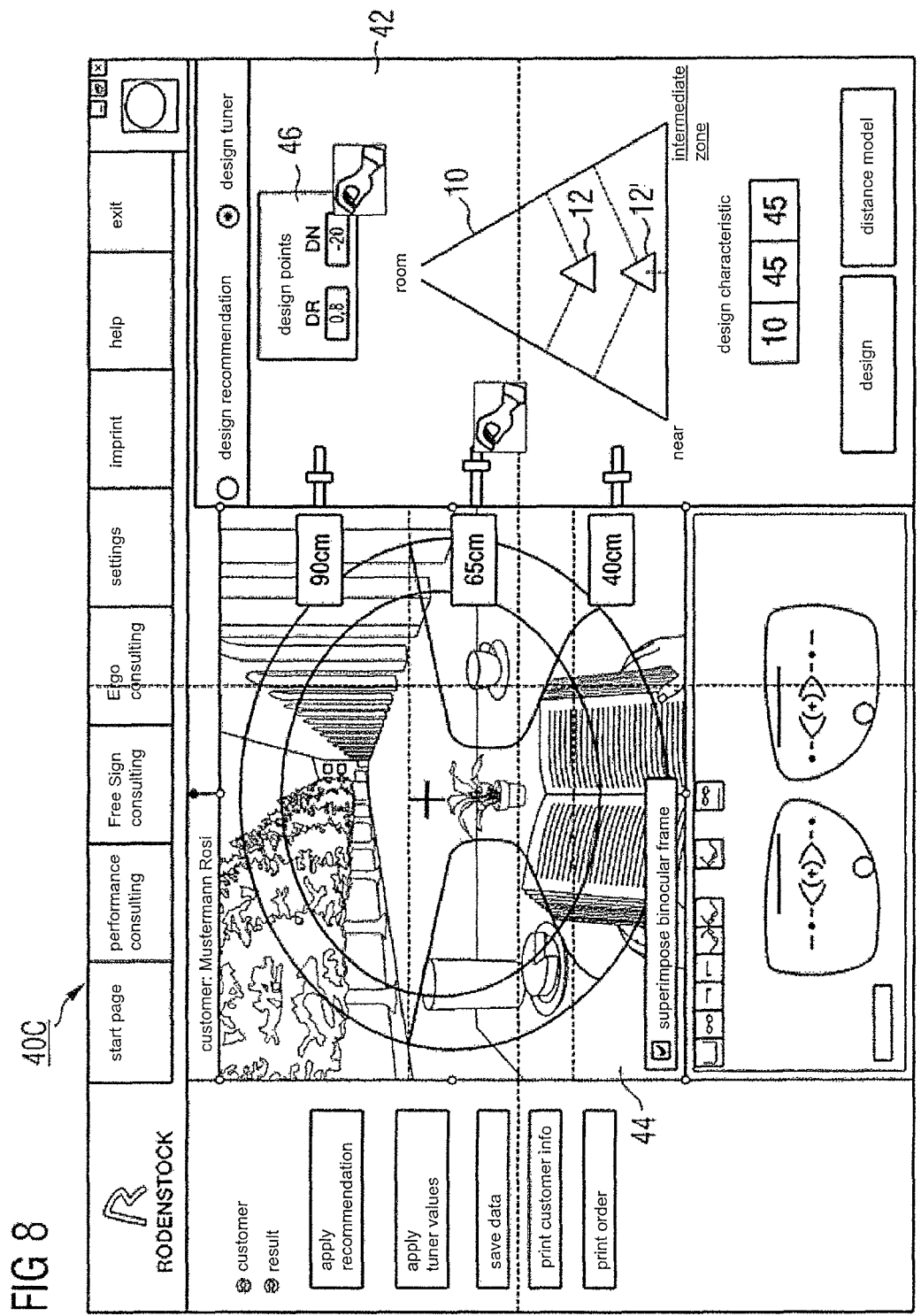

FIGS. 6 to 8 show examples of graphical user interfaces 40A, 40B, 40C for visualizing and optionally interactively modifying a design for a progressive spectacle lens, wherein the design is visualized in particular as a point within a predetermined design polygon. The graphical user interfaces 40A to 40C each comprise a first display portion 42 and a second display portion 44.

The first display portion 42 is adapted to visualize the calculated position of the determined point $P=P_{Design}$ within the design triangle 10. In the embodiments shown in FIGS. 6 to 8, the position of the point P is visualized by a small triangle 12. The position of the point P can be changed interactively. The reference numeral 12' designates the new position of the point P. The first display portion further comprises a design parameter display portion 46 adapted to display design parameters (for example design points) of the design corresponding to the point P.

The second display portion 44 is adapted to display the visual impression through a progressive spectacle lens having the design assigned to the point $P=P_{Design}$. The second display portion can be further adapted to schematically display (for example in a perspective or front view) a finished spectacle lens or a pair of finished spectacle lenses having the design assigned to the point $P=P_{Design}$.

Figure 9:
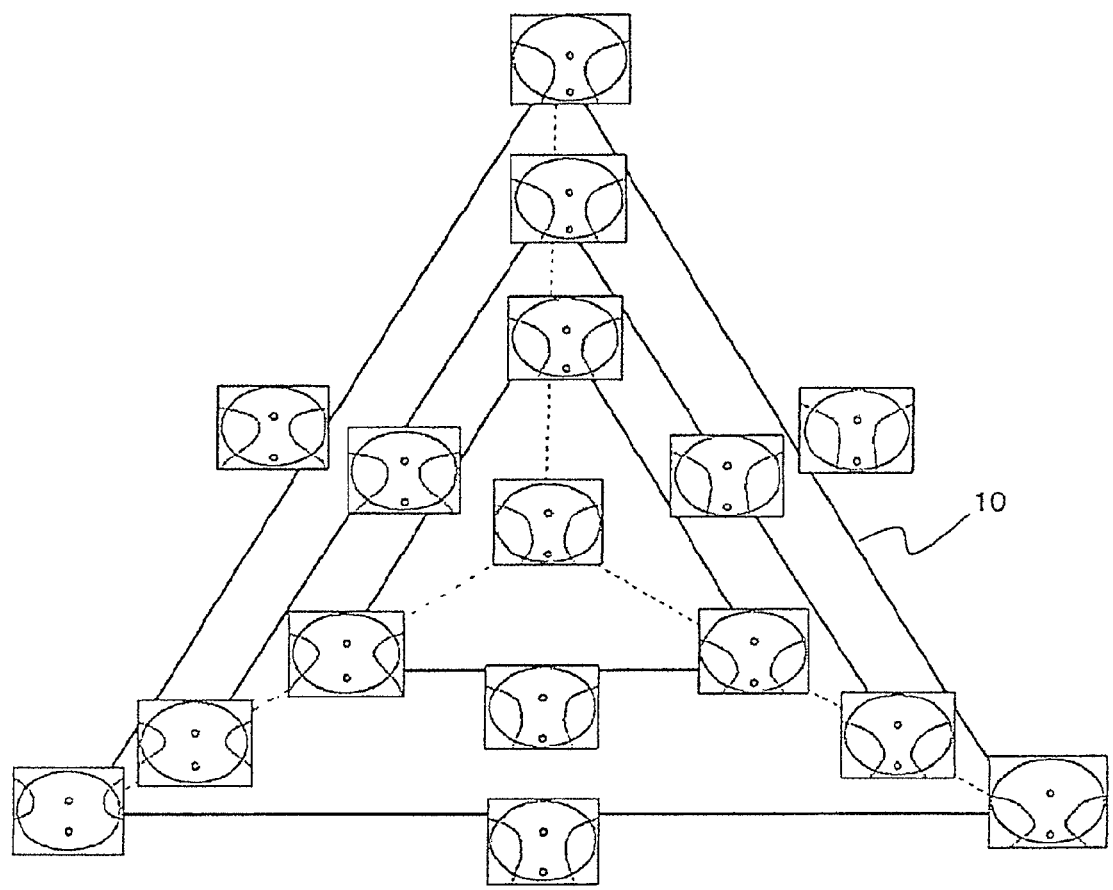
FIG. 9 illustrate examples of different designs within a design polygon according to exemplary embodiments.

FIG. 9 shows different types of design within a design triangle.

Figure 10:
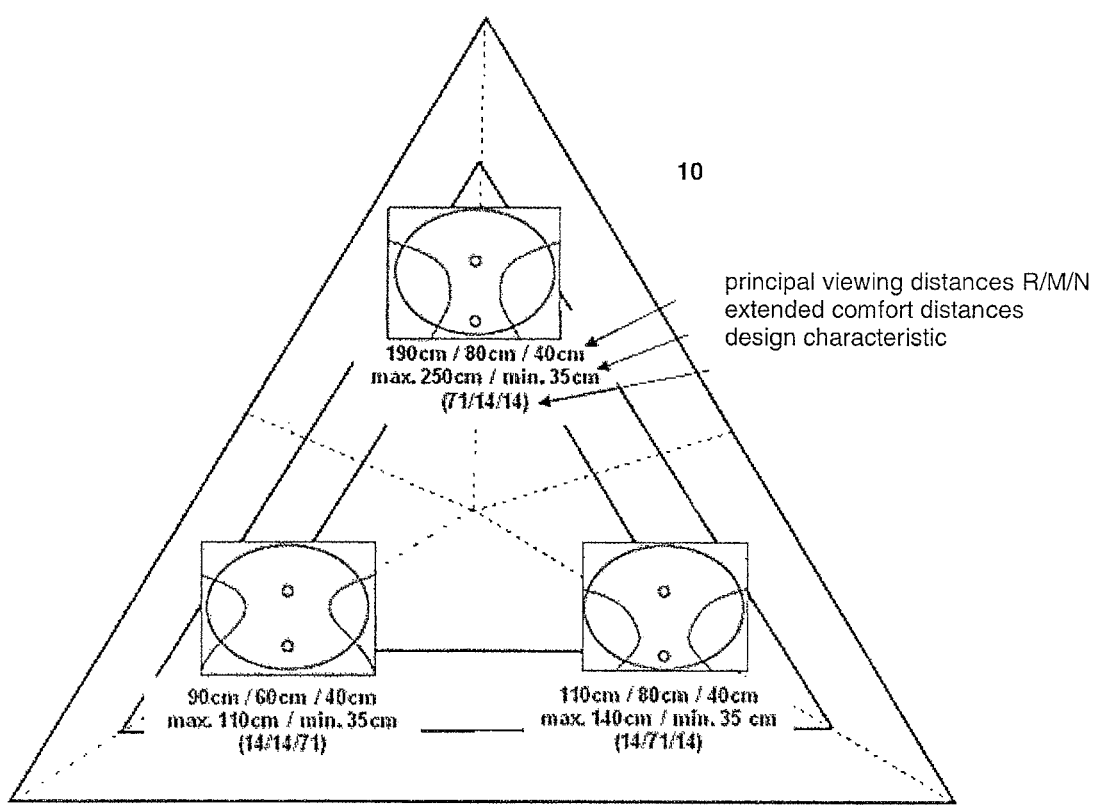
FIG. 10 illustrate examples of three different designs within a design polygon.

FIG. 10 shows examples of three different designs within a design triangle. The three types of design illustrated in FIG. 10 do not lie in the corners of the design triangle, but are slightly displaced inward. They are not intended to represent design extrema. Below the respective design are shown the principal viewing distances (room, mid-range, and near); extended comfort distances and the allocation of points concerning the weightings room, mid-range, and near (design characteristic); and the position of the design points.

Figure 11:
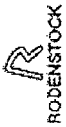
FIG. 11 illustrates an example of a graphical user interface for inputting data of the progressive spectacle lens and of the spectacle wearer.

FIG. 11 shows an example of a graphical user interface 50 for inputting data of the progressive spectacle lens and of the spectacle wearer. The data of the progressive spectacle lens and of the spectacle wearer comprise in particular refraction data (sphere (sph), cylinder (cyl), axis, addition (add), prism, basis), individual parameters of the spectacle wearer and of the individual position of wear (pupillary distance (PD) right and left, corneal vertex distance (CVD) right and left, forward inclination (FI) right and left, face form angle (FFA)); as well as frame and centration data (fitting height right and left, diameter right and left, decentration right and left, horizontal lens size, vertical lens size, distance between the lenses (AZG), etc.). Further, there is the possibility of indicating the refractive distance near. If, during near vision, the spectacle wearer exhibits a convergence behavior that deviates from the standard, the predefined value (100%) in the field Inset can be changed.

The individual parameters of the spectacle wearer and of the individual position of wear (PD, CVD, FI, FFA, etc.) can be obtained by a 3D video centration system (for example ImpressionIST®Avantgarde by the company Rodenstock GmbH), for example. The 3D video centration system allows an exact determination of all individual parameters as well as of the centration and frame data during a natural head and body posture. Also, measuring tools developed for these purposes can be used to determine the individual parameters.

The values of the frame and centration data can be entered automatically as soon as a corresponding menu item or menu button (for example "frame from tracer" or "frame Rodenstock") has been selected. With the help of the function "adapt to box dimension", the frame can be adapted to the modified frame data, if necessary.

The above-described method can be part of a computer program for customer advisory services. During the consultation, first of all the one starting position in the design triangle can be determined and visualized. This starting position, which determines a corresponding design, can be generated directly from the customer preferences, i.e. the allocation of points e.g. in a graphical user interface (design profiler or design optimizer), for example.

In particular, in a consultation, the customer (spectacle wearer) can be asked about their preferences. On the basis of this questioning, a maximum of 10 points can be allotted for the three focuses of design assigned to the corners of the design triangle 10 (for example room, intermediate zone, and near) in the input portion of the graphical user interface "design optimizer" or "design profiler" 60 shown in FIG. 12. Further, in this example, a maximum of 5 points can be allotted for each focus. The allocation of points allows a direct conclusion about the position in the design triangle 10, since this allocation of points corresponds to the focuses of the corners of the design triangle 10.

For example, if $p_1$, $p_2$, $p_3$ designate the allocation of points from the "design profiler" 60 and "a" designates a safety distance to the edge of the design triangle 10, which the starting position determined after the consultation preferably is to exhibit, then the distances of the point in the triangle to the triangle sides are calculated as follows:

$$g_1 = p_1 + a,$$
$$g_2 = p_2 + a,$$
$$g_3 = p_3 + a$$

$$a_1 = \frac{k}{g_1 + g_2 + g_3} g_1$$

$$a_2 = \frac{k}{g_1 + g_2 + g_3} g_2$$

$$a_3 = \frac{k}{g_1 + g_2 + g_3} g_3,$$

wherein k is the required sum of the vertical distances to the triangle sides (for example k=100).

A safety distance a is specified in order to not arrive at an extreme lens design already after the first consultation. For example, a can be =0.7. Also, the maximum single point allocation can be $p_{max}$=5.

Example:

| profiler | corrected values | design weighting |
|---|---|---|
| room $p_1$ = 1 | $g_1$ = 1.7 | $a_1$ = 15.3 => 15 |
| room $p_2$ = 5 | $g_2$ = 5.7 | $a_2$ = 51.4 => 51 |
| room $p_3$ = 3 | $g_3$ = 3.7 | $a_3$ = 33.3 => 33 | a = 0.7
k = 100

These parameters result in a design number=155133.

Figure 13:
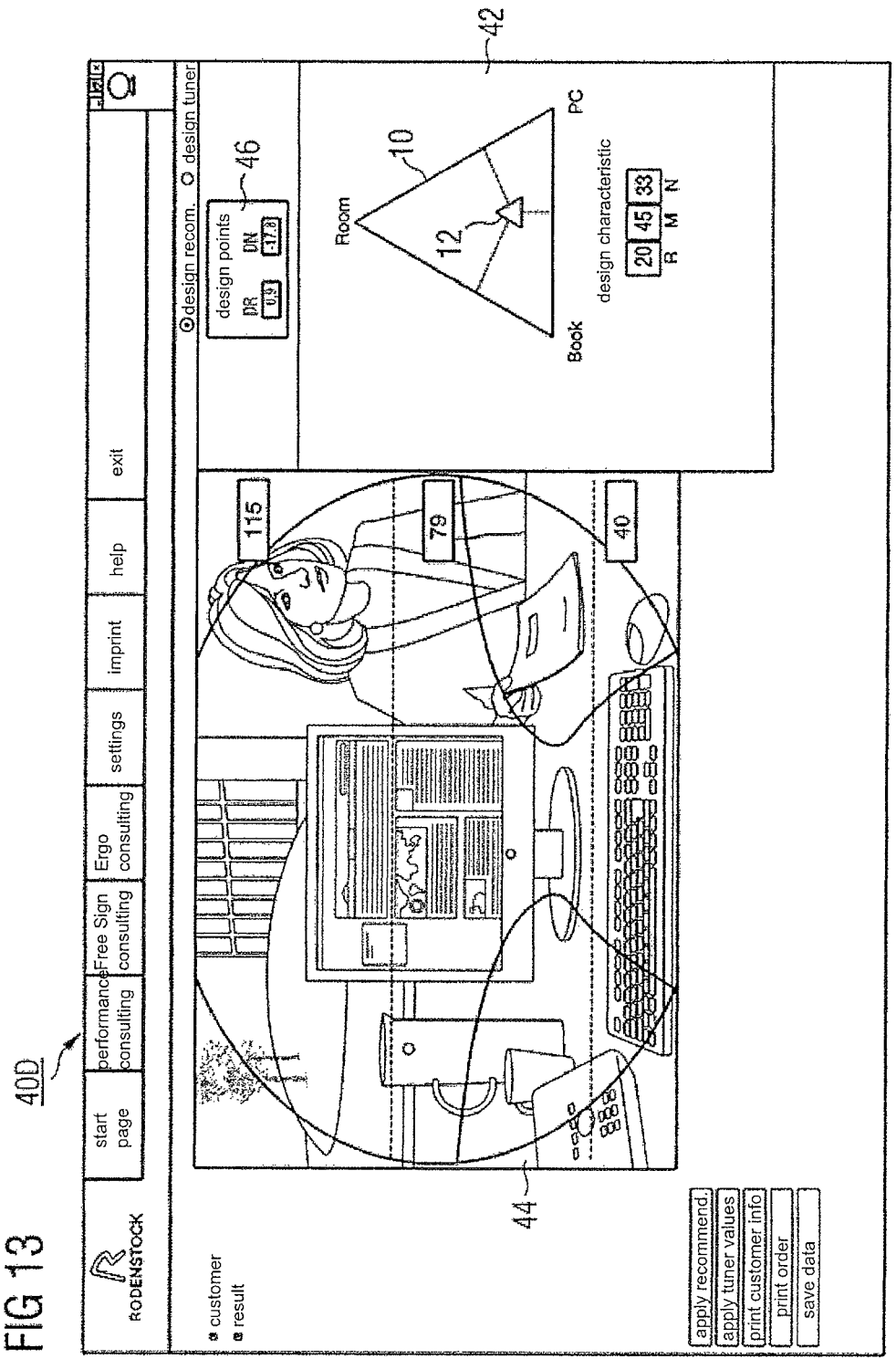
FIGS. 13 to 15 illustrate examples of graphical user interfaces.
Figure 14:
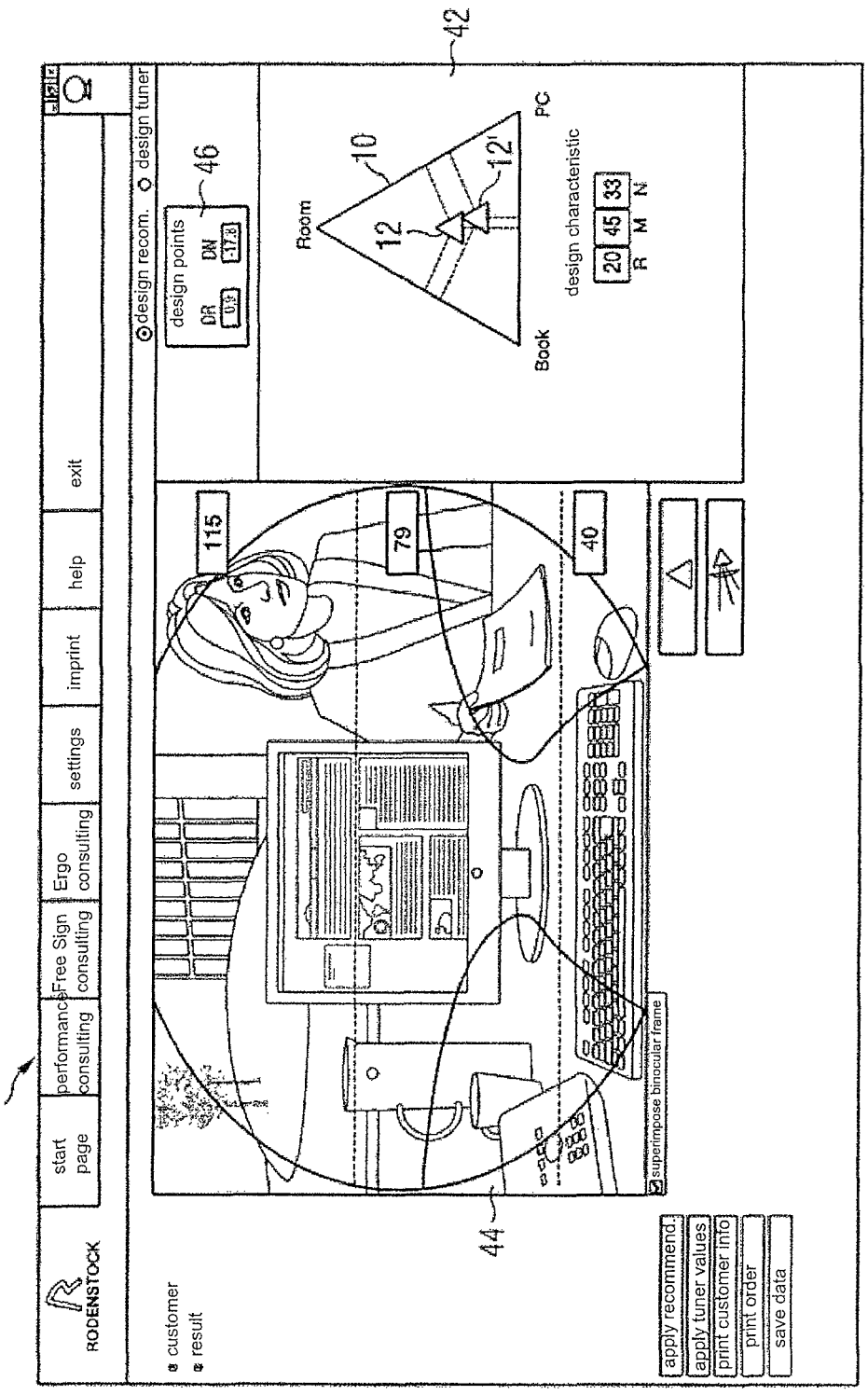
Figure 15:
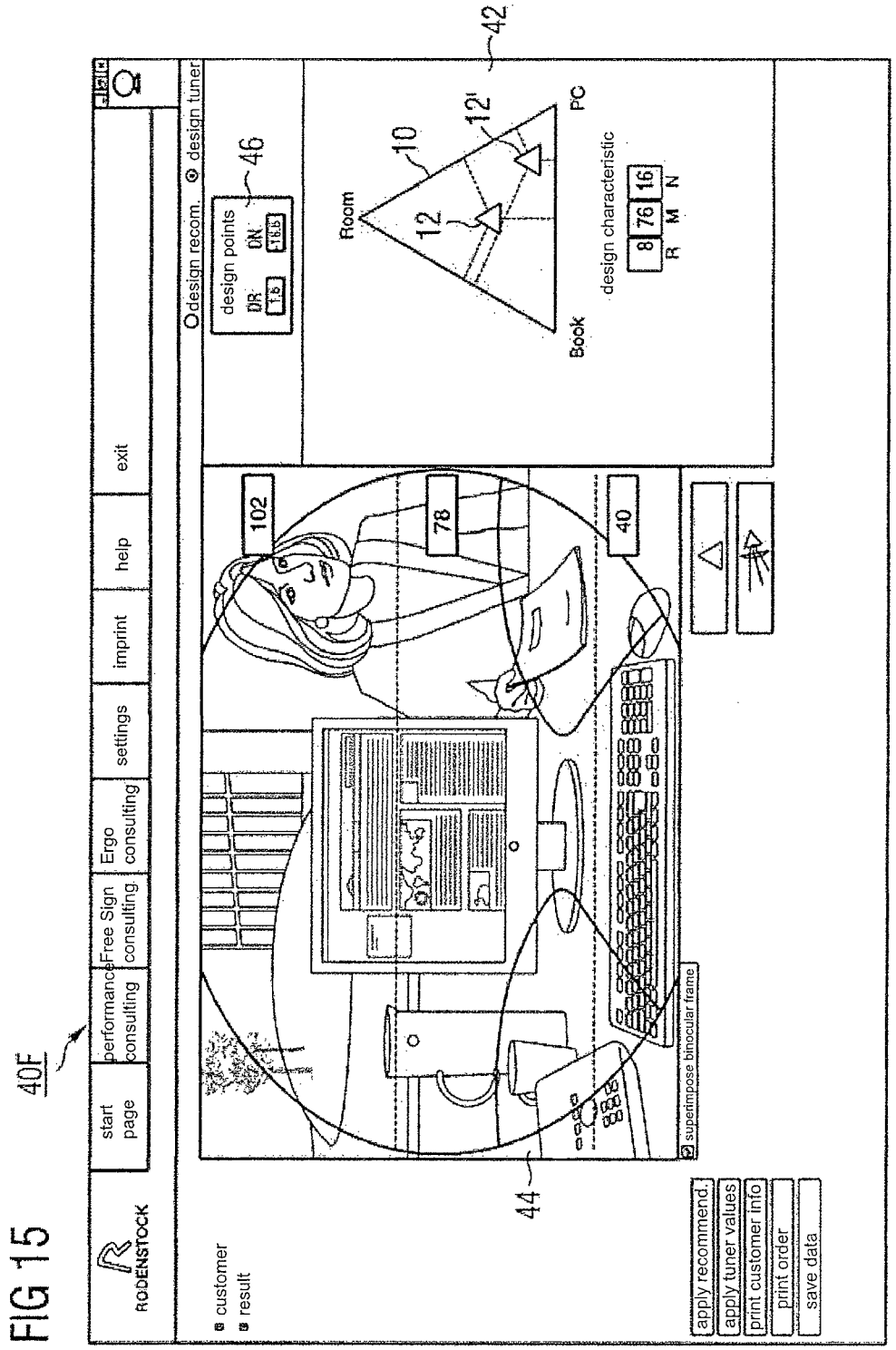

FIGS. 13 to 15 show further examples of graphical user interfaces 40D, 40E, 40F for visualizing and optionally modifying a design for a progressive spectacle lens (also referred to as "design tuner" or "design optimizer" in the following. The graphical user interfaces 40D to 40F each comprise a first display portion 42 and a second display portion 44. The first display portion is adapted to visualize the calculated position of the determined point P=$P_{Design}$ within the design triangle 10. In the embodiments shown in FIGS. 14 to 16, the position of the point P is visualized by a small triangle 12. The first display portion 42 further comprises a sub-portion 46 (design parameter display portion) particularly adapted to display the design number as well as design points mid-range DM and near DN. The second display portion 44 comprises a design display portion adapted to display the visual impression through a progressive spectacle lens having the design assigned to the point P.

The described procedure of generating the target, optimization and calculation specifications of progressive spectacle lenses (progressive lenses) with a variable lens design can be integrated into a consultation program. However, the method can of course also be used without a consultation program. An arbitrary number of lens designs can be generated from a predetermined starting design file. For the individual products/designs, only the associated design number or position in the design triangle has to be deposited. For example, the fixed designs Ergo Book, Ergo PC, and Ergo Room of Multigressiv Ergo and Impression Ergo by the company Rodenstock GmbH are generated by depositing the associated design numbers. Now, slight design modifications are always possible at a later time.

Also, additional designs with changed focuses (distance/car driving design, near design, etc.) can be generated quickly for an existing type of progressive lens/starting design, or slight design modifications can be made. It is of course still possible to additionally change the position of the design points and to adapt the object distances in the reference of design points.

Further embodiments, advantages, and characteristics of the disclosure herein as well as background information can be taken from the following examples.

One example relates to the determination of a design for an individual near-vision lens on the basis of a design triangle.

Near-vision spectacle lenses or near-vision lenses are progressive spectacle lens that enable a vision in near and intermediate zones and the corresponding distances. The individual viewing zones of the spectacle lens are adapted to the vision in the different near distances and are arranged accordingly. Classical near-vision lenses mostly have a progressive front surface; the prescription surface is manufactured on the eye side after receipt of order. Here, use is made of preformed and thus standardized blanks (semi-finished products) in the manufacture according to the base curve system. In contrast to spectacle lenses produced with the free-form technology, they are not optimized for each power individually. As a result, the optical performance of lenses with different refraction data from one and the same product family can be different. Moreover, the fit of the frame and the physiognomy of the spectacle lens influence the size of the viewing zones. If, instead of the individual frame and centration data, standard values are taken into account in the calculation of the lenses, which deviate from the real situation of wear, this leads to a restriction of the usable viewing fields. With the fixed degressions of classical near-vision lenses, different visual heights in the spectacle lens for specific distances result depending on the accommodation of the spectacle wearer. Thereby, the principal viewing distance does not coincide with the largest viewing zone in the spectacle lens. Head posture and infraduction have to be adapted to the lens, which can become uncomfortable over time.

In contrast, individual near-vision lenses (such as Impression Ergo by the company Rodenstock GmbH) are calculated or optimized individually taking prescription data, individual data of the spectacle wearer (individual parameters of the spectacle wearer and the position of wear of the spectacle lens or the spectacles) into account. Moreover, ergonomics parameters, design parameters and/or visual preferences can be taken into account.

The exemplary method for determining and optionally optimizing a design for a near-vision lens, which will be described in the following, allows designing a spectacle lens and in particular a near-vision lens, which is optimized according to the individual habits of a spectacle wearer for use in near vision, in an efficient way. The new degrees of freedom offer the possibility of adapting the design for a near-vision lens to almost any situation during use at near and mid-range distances. Thus, the spectacle wearer obtains maximally large viewing zones for the distances they mainly use, with smooth transitions between the central and peripheral viewing zones. The viewing zones are arranged such that a relaxed and fatigue-free vision at a natural head and body posture is possible. Thus, optimum imaging properties can be ensured for all applications.

Within the design triangle (which can represent a family of designs, for example a family of near-vision lens designs), in particular the following types of the designs can be specified, wherein the principal viewing distances are deposited for the respective design, and the design points are matched to the respective design. The three designs or types of designs correspond to the three main applications of near-vision lenses and the corner designs in a design triangle.

The Book Design

This design is selected such that it offers the widest viewing zones in the lens for a working distance within reach (in approx. 40 cm). In addition, the spectacle wearer is guaranteed a clear vision up to approx. 90 cm. The design is made such that it allows a larger viewing zone for vision at close distances, combined with a comfortable infraduction. For this design, the design point mid-range DM can be at a vertical height relative to the centration cross of 0 mm, and the design point near DN can be at a vertical height relative to the centration cross of −14 mm.

The PC Design

This design is selected such that it offers the widest viewing zones in the lens for a working distance to a PC/monitor. In addition, the spectacle wearer is guaranteed a clear vision within approx. 40 cm to approx. 1.20 m. The design is made such that it offers a larger viewing zone for vision in the desk distance. Due to the corresponding power increase in the lens, the spectacle wearer has a clear vision within approx. 1.20 m with the PC design. Thus, a person sitting opposite would still be seen clearly. For this design, the design point mid-range DM can be at a vertical height relative to the centration cross of 0 mm, and the design point near DN can be at a vertical height relative to the centration cross of −18 mm.

The Room Design

This design is selected such that it offers the widest viewing zones in the lens for a distance longer than a working distance to a PC/monitor. In addition, the spectacle wearer is guaranteed a clear vision within approx. 40 cm to approx. 2 m. Due to the corresponding power increase in the lens, the spectacle wearer has a clear vision within approx. 2 m at the zero direction of sight with the room design. Thus, a flipchart would still be seen clearly during a presentation, for example. For this design, the design point mid-range DM can be at a vertical height relative to the centration cross of −2 mm, and the design point near DN can be at a vertical height relative to the centration cross of −18 mm.

The following optimization parameters can in particular be taken into account in the design determination and design optimization:
  ergonomics parameters (such as design characteristics (characterized by the design number, for example) and individual principal viewing distances);
  design parameters (such as design points mid-range and near, free base curve selection),
  individual parameters (such as pupillary distance (PD), corneal vertex distance (CVD), forward inclination (FI), face form angle (FFA)).

Design Parameters

For an individual near-vision lens, the specific viewing habits of a spectacle wearer can be taken into account in the calculation of the design for the spectacle lens and thus also in the calculation of the spectacle lens by considering two design or reference points. This can be achieved by indicating the design points mid-range DM and near DN. The position of the design points is predefined for the three specified design types (for example Book, PC, and Room), i.e. for the corner design. The design points mid-range and near can be set to be variable but always the same for right/left (R/L) in defined areas. The positions of the design points mid-range and near can be indicated as the vertical distance relative to the centration cross each.

The determination of the ideal position of the design points can be integrated into an interactive consultation program (such as "Ergo Consulting" by the company Rodenstock GmbH).

The design point near describes the visual point of the spectacle wearer for near vision. Here, the spectacle wearer is optimally corrected for near-vision tasks and can assume an infraduction they are comfortable with. The design point near DN is shiftable in a range between −12 mm and −20 mm, preferably in a range between −14 mm and −18 mm below the centration cross. By changing the design point near DN, a larger near-vision zone can be obtained, for example, if the spectacle wearer attaches particular importance to that. In this case, the design point DN would be shifted upward to obtain a larger near zone and a reduced infraduction, which is more comfortable for the spectacle wearer.

The design point mid-range DM describes the visual point of the spectacle wearer for mid-range vision. In this zone, the spectacle wearer is optimally corrected for mid-range distances. The design point DM can be in a range between −4 mm to +4 mm around the centration cross. A change of the position of the design point mid-range DM results in a shortening or a lengthening of the progression zone in the vertical direction. This also influences the size of the viewing zones and the transitions between the central and peripheral viewing zones. A further power decrease occurs above the design point mid-range DM irrespective of the design.

For example, certain conditions can be placed on the position of the design points mid-range and distance depending on the frame data. Thus, it is advantageous to satisfy the following conditions:
  DN at least 2 mm above the lower frame edge;
  minimum distance DM-DN: 12 mm;
  maximum distance DM-DN: 24 mm;
  design point mid-range DM at least 10 mm below upper frame edge.

These conditions can be considered automatically in the case of a design recommendation. In a graphical user interface (cf. e.g. the graphical user interface "design tuner" 40A to 40F), marginal parameters can be displayed by a note or in a different way.

For example, the position of the design point near DN can be adapted to the selected spectacle frame on the basis of the frame and centration data provided together with the order for the spectacle lens. This ensures an optimum use of the frame size. The position of the design point near DN is calculated considering forward inclination, corneal vertex distance, as well as frame and centration data, so that the spectacle wearer can assume their individual, physiologically convenient infraduction.

Moreover, differences in the progression zone length and/or in the position of the design point near DN can result from differently sized CVDs and/or forward inclination of the spectacle lens. A small CVD requires a shorter progression length for the same infraduction, for example. A small forward inclination, however, requires a longer progression zone length for the same infraduction.

In a graphical user interface, such as a graphical user interface "design tuner" 40A to 40F, it can be shown how a shift of the position of the design points influences the lens design. Due to the power increase in the spectacle lens, the widths of the viewing zones and the level of the surface astigmatism depend on the addition of the spectacle lens and on the length across which the power increase occurs. This phenomenon is known as the "Minkwitz theorem". The choice of the correct position of the design points thus is a careful consideration of advantages and restrictions in the spectacle lens resulting from the physical conditions. If the progression and/or the degression is/are extended due to a slight shift of the design point mid-range DM upward and the design point near DN downward, wider viewing zones are made possible. Such a spectacle lens is particularly suitable for spectacle wearers using these spectacles mainly for mid-range vision, for example for PC work.

In addition to the individual parameters, individual vision needs for near and mid-range vision can be taken into account as well. Activities at near and mid-range distances can be as individual as the fit of spectacles. For example, a spectacle wearer needs spectacles when looking at a monitor, which is positioned at a different height and distance on their desk than that of their colleague. Another spectacle wearer needs spectacles for activities mainly at distances of about 2 m, but also wishes to use them for reading. The different vision needs result e.g. in a different allocation of points in the "design profiler" (see FIG. 12). Moreover, the different vision needs result in different design numbers.

Design Number and Design Characteristic

In particular the design number, which correlates with the design characteristic, is required for the calculation of the individual design for a near-vision lens. The design number can be a six-digit number, wherein the first two digits (left number) relate to vision in a room (at the distances of approx. 60 cm to 3 m), the two middle digits (the middle number) relate to vision at mid-range distances (from approx. 40 cm to 1.5 m), and the two right digits (right number) relate to vision at near distances (from approx. 20 cm to 100 cm). The design number per distance zone can have a minimum value of 00 and a maximum value of 99, for example. The higher the value for the respective zone, the greater the priority and thus the size of the viewing zones. The design number also affects the distance zones and the associated spatial depth. The sum of the three design numbers is 99 at most. If it is above or below, the value can be standardized automatically.

The design characteristic can be illustrated graphically by the design triangle. The higher the weighting of the design characteristic in one zone, the more the small triangle designating the design is positioned in a corner of the design triangle.

Individual Principal Viewing Distances

In the optimization of conventional near-vision lenses, the surface is calculated for a specific working distance (for example 40 cm for near vision). However, to ensure the best imaging for the spectacle wearer in their individual environment for near and mid-range vision, a consideration of these individual principal viewing distances is unavoidable. For individually optimized near-vision lenses, the principal viewing distance can be adapted individually depending on the application purpose. Thus, the entire ergonomics of the spectacle wearer for near and mid-range vision can be taken into consideration.

For example, the following value ranges apply to the principal zones of use of a near-vision lens:

TABLE 2

| principal viewing distance near | 20 cm to 100 cm |
| principal viewing distance mid-range | 40 cm to 150 cm |
| principal viewing distance room | 60 cm to 3 m |

The principal viewing distances are reflected in the design points. The position of the zone for distances of greater than 1 m is in the upper area of the spectacle lens, above the design point mid-range DM.

A deviating refractive distance can also be taken into account in the calculation of the individual design.

The determination of the best possible, individual design for a progressive spectacle lens, for example a near-vision lens, can be assisted by a corresponding computer program (for example the consultation program Impression Consulting by the company Rodenstock GmbH, in which a corresponding design consultation module is integrated). The computer program can offer the possibility of advising the spectacle wearer in their choice of design and of setting the design parameters. The computer program can automatically calculate the final design and in particular the spatial distribution, assigned to the final design, of one or more optical properties (for example target astigmatism distribution), which are taken into account in the target function as target values.

The user can interact with the computer program via one or more (interactive) graphical user interfaces, which comprise one or more sections or menus.

A graphical user interface can be adapted, for example, to present or display the performance of the optical properties of an individually optimized near-vision leans with respect to a progression lens and normal reading spectacles. To facilitate the choice and the consultation, an information text about the respective product can be displayed as soon as one of the information buttons is activated. In one menu, the target design with the focus of application "room", "intermediate zone", or "near" (or other focuses of use) can be selected. The spectacle wearer's addition can be adjusted with a slider, for example. To show the influence of the individual parameters, they can be modified in a mask by actuating a corresponding slider or by manually inputting the values.

Figure 12:
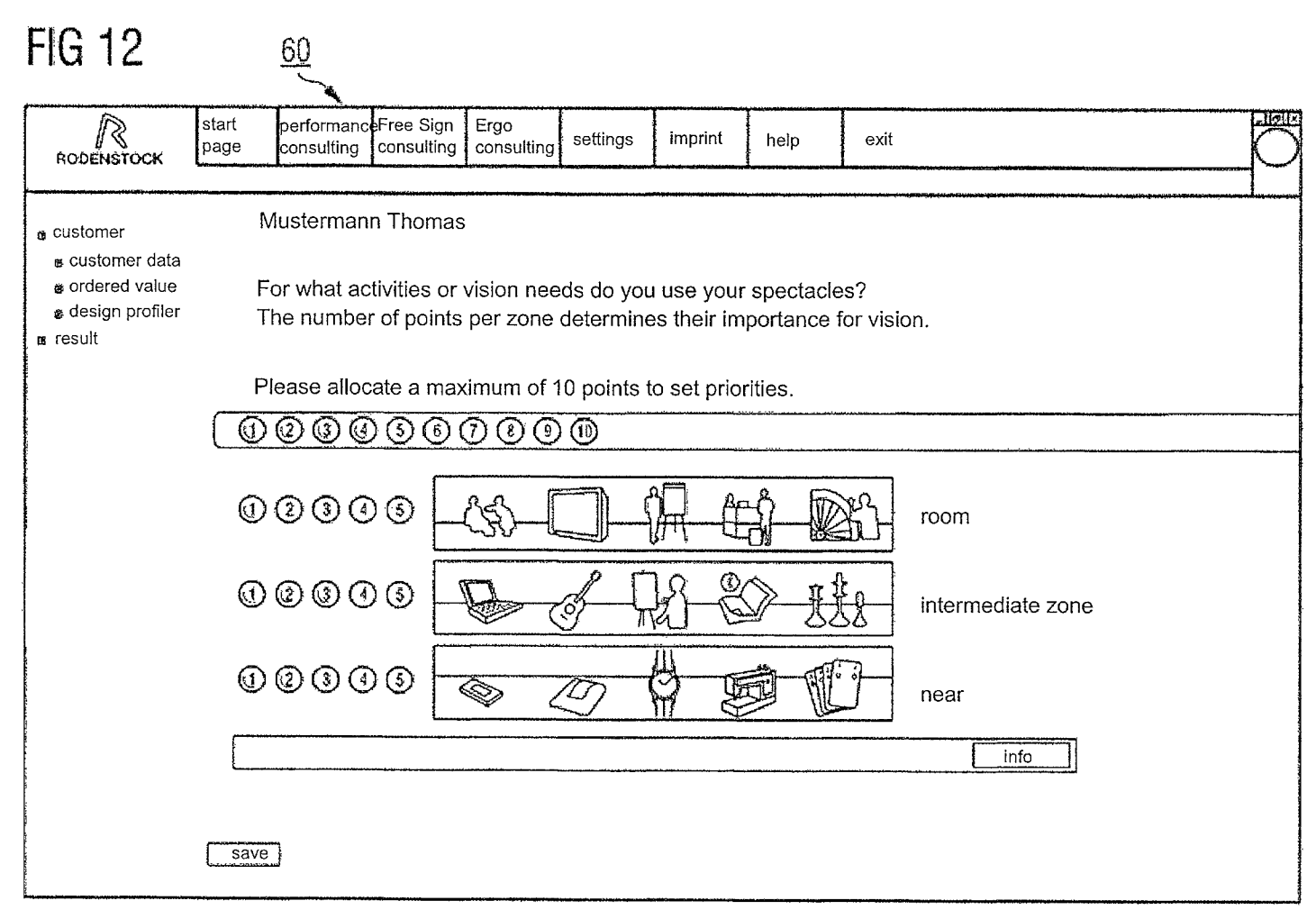

The individual preferences of the spectacle wearer can be obtained via the graphical user interface "design profiler" 60 shown in FIG. 12. In the "design profiler" 60, the individual needs and wishes of the spectacle wearer are gathered, so that they can be taken into account in the determination of the individual design for a near-vision leans together with the individual parameters as well as the frame and centration date. By the allocation of points, the spectacle wearer can weight the distance zones "room", "mid-range" (or "intermediate zone"), and "near" according to their personal near-vision needs. The more important the respective distance zone is to the customer, or the more often the activities of the customer fall within this zone, the more points can be allotted for this distance zone.

In one example, a maximum of five points can be allotted per distance zone, in total not more than 10 points though. The weighting determines the individual design profile of the spectacle wearer. The more a specific distance zone is preferred, the more strongly it is reflected in the viewing zones of the lens (design recommendation). The more points are allotted for the room, the more spatial depth (degression) the recommended lens design has. Five different pictographs for the room, intermediate, and near distances symbolize the zones the customer is to weight relative to each other when choosing their design profile. The pictographs serve as an example of the respective distance zone and represent only a small choice of all possible activities for that distance. The bars illustrate the characteristic of the three viewing zones in the lens.

The result of the design determination or the design recommendation in dependence on the obtained individual data and preferences of the spectacle wearer can be displayed when a result mask or a graphical user interface is opened. Examples of such result masks or graphical user interfaces are shown in FIGS. 6 to 8 and 13 to 15. The ergonomics parameters, design characteristic and principal viewing distances, as well as the design parameters, design point mid-range DM and design point near DN are in particular part of the design recommendation.

The design characteristic describes the arrangement and the size of the binocular viewing zones in the lens. The principal viewing distances and the design characteristic reflect the allocation of points in the design profiler 60. The position of the design points mid-range DM and near DN depends on the design characteristic, the frame and centration data, as well as on the individual parameters, forward inclination, and corneal vertex distance.

On the right of the result masks 40A to 40F shown in FIGS. 6 to 8 and 13 to 15, the design triangle is illustrated. The corners of the design triangle 10 represent the three distance zones "room", "mid-range" (or "intermediate zone"), and "near". The position of the small triangle 12 within the design triangle results in the design recommendation, which reflects the weighting in the design profiler. For example, the more heavily the distance zone "mid-range" was weighted in the design profiler, the farther the small triangle is shifted to the corner "mid-range". This applies analogously to the two other corners "near" and "room" of the design triangle.

The weighting of the three distance zones is reflected in the characteristic of the corresponding viewing zones in the spectacle lens. The more heavily the distance zone "room" is weighted, the wider the usable viewing zone in the upper portion of the spectacle lens and the greater the depth of field or degression of the spectacle lens. If the priority is set on the distance zone "near" in the design profiler 60, the depth of field in the lens is reduced, but the viewing zones are extremely wide. With such a spectacle lens, the spectacle wearer can read for a long time in a relaxed way, for example.

By clicking the button "apply recommendation" and "save data", the design recommendation can be applied. However, it is possible to further modify the recommended design. This is referred to as "design tuning".

Thus, the design recommendation can be modified by shifting the small triangle within the design triangle. Since the design recommendation includes the arrangement and the size of the viewing zones in the spectacle lens (design characteristic), the principal viewing distances, and the position of the design points DM and DN, all parameters change analogously by shifting the small triangle. The changes are reflected in the viewing zone representation. For example, the changes of the design points DM and DN, etc., can be highlighted in color or in another way.

Furthermore, the position of the design points and the principal viewing distances can be changed independently from each other, but preferably within defined, practical limits.

EXAMPLE

The optician allocates the following number of points in the design profiler 60 on the basis of the data of the spectacle wearer: room: 0 points, mid-range: 0 points, near: 5 points. In the design recommendation, a design characteristic of 9/9/80 (9=room/9=mid-range/80=near) results. The following principal viewing distances result: room: 78 cm/mid-range: 58 cm/near: 40 cm. Moreover, in the consultation, the spectacle wearer says that the laptop he works with is approx. 50 cm away from him. The optician can then enter the target principal viewing distance into the corresponding field provided in the design tuner. The suitable design is calculated automatically then.

The design, which is individually adapted to the customer profile, can be applied by actuating the corresponding design button ("apply tuner values" and "save data"). There is the possibility of returning to the design recommendation with the button "design recommendation".

When the individual design for the progressive spectacle lens (for example an individual near-vision lens) has been definitely defined, the spectacle lens is calculated or optimized. The calculation or optimization of the individual spectacle lens can be performed by an iterative minimization of a target function, as has been described. The target astigmatism values assigned to the determined, individual design and optionally other optical properties are taken into account in the target function as target values.

The individual optimization is performed for each power (sphere and/or cylinder and/or prism). Moreover, the optimization can be performed considering previously obtained data of the spectacle wearer, for example according to the optimized retina focus principle. For example, the individual data of the spectacle wearer can comprise the pupillary distance PD, the inset, the corneal vertex distance CVD, the face form angle FFA, the forward inclination, the design point near DN, the possibly present anisometropia, frame and/or centration data, etc. The (individually) optimized spectacle lens is calculated in the position of wear by wavefronts. The spectacle lens can be optimized with respect to a minimization of the HOA (high order aberration) and taking Listing's rule into consideration.

The front surface of the optimized spectacle lens can be a spherical surface, the back surface an individually optimized progressive surface. The base curve of the front surface can substantially be selected freely. In particular, the base curve can be adapted to the curving of the frame. The individual spectacle lenses can be produced by free form technology.

The spectacle lens can be manufactured from a highly refractive, optical material (for example from a material having a refractive index of 1.6). The material produced from such a material is aesthetically thin and well suited for rimless-frames.

Figure 16:
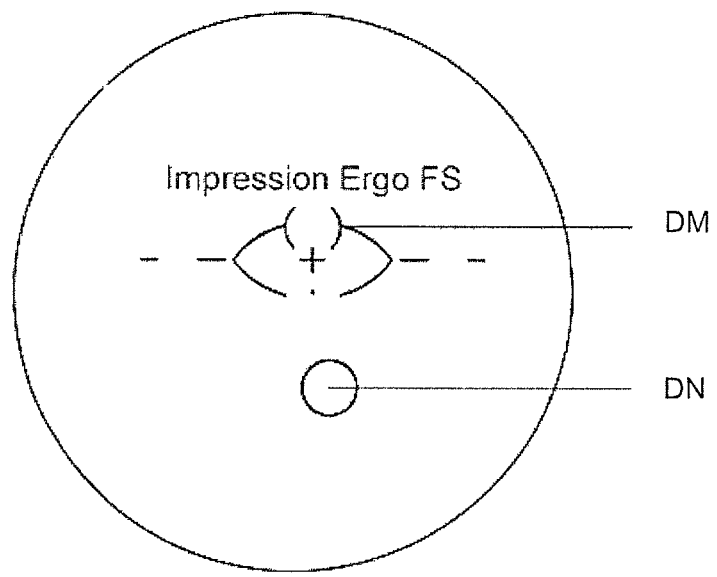
FIG. 16 illustrates an example of the stamping of an individual spectacle lens.

The spectacle lens can be provided with a stamping. An example of a stamping of an individual near-vision lens is shown in FIG. 16.

The stamp 70 of the individual near-vision lens consists of "movable" and "fixed" components. The brackets, which designate the position of the design point mid-range DM, and the near measuring circle, which designates the position of the design point near DN, are part of the "movable" components of the stamping. The position of the design points varies depending on the determined design parameters and the individual parameters of the spectacle wearer. The horizontal position of the near measuring point varies depending on the inset, which results individually after receipt of order and depending on the refraction data, the individual parameters, and the reading distance.

In exceptional cases, the stamping can deviate from the above-mentioned one. The design points are not explicitly designated then. However, they could be reconstructed by a centration card and the stamped scales in steps of 1 mm and the indication on the spectacle lens envelope. Moreover, the values for the position of DM/DN are engraved in the lens below the nasal engraving for base curve and refractive index.

The above-described exemplary method for determining a design for an individual near-vision lens can of course also be applied analogously to the determination of a design for a universal, (individual) progressive spectacle lens with distance, intermediate, and near zones. The defined designs (corner designs and optionally additional designs) of the design triangle then represent different designs (e.g. depending on different focuses of use) for universal progressive spectacle lenses. The design parameters (for example design point mid-range DM, design point near DN), which characterize a design for an individual near-vision lens, are then replaced by design parameters (for example design point distance DF, design point near DN), which characterize a design for a universal progressive spectacle lens.

Designs for non-individual progressive spectacle lenses (universal progressive spectacle lenses or special progressive spectacle lenses, such as near-vision lenses) can be determined with the above-described method as well.

It should be understood that while the foregoing has been described in conjunction with exemplary embodiments, it is understood that the term "exemplary" is merely meant as an example, rather than the best or optimal. Accordingly, the disclosure herein is intended to cover alternatives, modifications and equivalents, which may be included within the spirit and scope of the disclosed apparatus and method.

Additionally, in the preceding detailed description, numerous specific details have been set forth in order to provide a thorough understanding of the present disclosure. However, it should be apparent to one of ordinary skill in the art that the embodiments described herein may be practiced without these specific details. In other instances, well-known methods, procedures, components, and circuits have not been described in detail so as not to unnecessarily obscure aspects of the disclosure herein.

The invention claimed is:

1. A method for calculating design parameters $D^j$, $j=1, \ldots, M$ of a progressive spectacle lens design on the basis of a predetermined design polygon and manufacturing a progressive spectacle lens, the method comprising:
    specifying a point $P_{Design}$ within the predetermined design polygon, wherein the point $P_{Design}$ defines the spectacle lens design;
    determining a value $D^j(P_{Design})$ of each design parameter $D^j$, $j=1, \ldots, M$, of the spectacle lens design at the point $P_{Design}$ by an interpolation of one or more predetermined values $D^j(P_{Corner})$, $j=1, \ldots, M$ at respective corner points $P_{Corner}$;
    determining a spatial distribution of target values of at least one imaging property or aberration of the progressive spectacle lens,
    wherein
        each point P within the predetermined design polygon defines one design that is characterized by design values $D^j(P)$,
        $D^j(P_{Corner})$, $j=1, \ldots, M$ of the design parameters characterize the design at the respective corner points $P_{Corner}$ of the predetermined design polygon,
        M designates the number of design parameters, and
        the progressive spectacle lens design comprises target values for the spatial distribution of the at least one imaging property or aberration of the progressive spectacle lens, and
    manufacturing the progressive spectacle lens in accordance with the spectacle lens design.

2. The method according to claim 1, wherein the interpolation is a linear interpolation at least in sections.

3. The method according to claim 1, wherein the predetermined design polygon is a design triangle.

4. The method according to claim 1, wherein the values $D^j(P_{Addition})$ of the design parameters $D^j$, $j=1, \ldots, M$ at at least one additional point $P_{Addition}$ on each of the side edges of the predetermined design polygon are each predetermined.

5. The method according to claim 1, wherein predetermined values $D^j(P_{Central})$ of the design parameters $D^j$, $j=1, \ldots, M$ characterize the design at a central point $P_{Central}$ within the predetermined design polygon, and wherein the value $D^j(P_{Design})$ of each design parameter $D^j$ at the point $P_{Design}$ is calculated by an interpolation of the one or more predetermined values $D^j(P_{Corner})$ of the design parameter $D^j$ at the respective corner points $P_{Corner}$ and the value $D^j(P_{Central})$ of the design parameter $D^j$ the central point $P_{Central}$.

6. The method according to claim 5, wherein the interpolation calculation comprises:

determining the penetration point $P_{Penetration}$ in the direction of the vector $P_{Central}P_{Design}$ of the straight line through the central point $P_{Central}$ and the point $P_{Design}$ with one of the side edges of the predetermined design polygon, wherein the vector $P_{Central}P_{Design}$ starts at the central point $P_{Central}$ and ends at the point $P_{Design}$;
    determining the two nearest points $P_{NL1}$ and $P_{NL2}$ on the side edge of the predetermined design polygon on which the penetration point $P_{Penetration}$ lies as well, in which corresponding values $D^j(P_{NL1})$ and $D^j(P_{NL2})$ of the design parameter $D^j$ are predetermined, wherein the penetration point $P_{Penetration}$ lies between the two points $P_{NL1}$ and $P_{NL2}$ on the side edge of the predetermined design polygon;
    determining the value $D^j(P_{Penetration})$ of the design parameter $D^j$ at the penetration point $P_{Penetration}$ by a first interpolation of the values of the design parameters $D^j(P_{NL1})$ and $D^j(P_{NL2})$ at the two points $P_{NL1}$ and $P_{NL2}$; and
    determining the value $D^j(P_{Design})$ of the design parameter $D^j$ at the point $P_{Design}$ by a second interpolation of the determined value $D^j(P_{Penetration})$ of the design parameter $D^j$ at the penetration point $P_{Penetration}$ and the value $D^j(P_{Central})$ of the design parameter $D^j$ at the central point $P_{Central}$.

7. The method according to claim 6, wherein the interpolation is performed in a polar coordinate system $\{\phi, \rho\}$, wherein the origin of the coordinate system coincides with the central point $P_{Central}$, and wherein the first interpolation is an interpolation with respect to the polar coordinate $\phi$, and the second interpolation is an interpolation with respect to the polar coordinate $\rho$.

8. The method according to claim 7, wherein, for the first interpolation:

$$D^j(P_{Penetration}) = D^j(P_{NL1}) + \frac{D^j(P_{NL2}) - D^j(P_{NL1})}{(\varphi_{NL2} - \varphi_{NL1})}(\varphi - \varphi_{NL1}),$$

and
wherein, for the second interpolation:

$$D^j(P_{Design}) = D^j(P_{Penetration}) + \frac{D^j(P_{Central}) - D^j(P_{Penetration})}{\rho}(\rho_s - \rho_i)$$

or $$D^j(P_{Design}) = D^j(P_{Penetration}) + (D^j(P_{Central}) - D^j(P_{Penetration}))(1-\alpha)$$

wherein:
    $(\phi, \rho)$ designate the polar coordinates of the point $P_{Design}$,
    $(\phi_{NL1}, \rho_{NL2})$ and $(\phi_{NL2}, \rho_{NL2})$ designate the polar coordinates of the two nearest points $P_{NL1}$ and $P_{NL2}$, wherein $\phi_{NL1} \leq \phi \leq \phi_{NL2}$,
    $\rho_S$ designates the distance of the point $P_{Penetration}$ from the central point $P_{Central}$,
    $D^j(P_{NL1})$ and $D^j(P_{NL2})$ designate values of the design parameter $D^j$ at the points $P_{NL1}$ and $P_{NL2}$, respectively, wherein the points $P_{NL1}$ and $P_{NL2}$ represent the points nearest to the point $P_{Design}$, for which points the design parameters $D^j$ are predetermined, and
    $D^j(P_{Central})$ designates the value of the design parameter $D^j$ in the central point $P_{Central}$.

9. The method according to claim 1, wherein the design parameters $D^j$ comprise at least one of the following parameters: weighting of the distance portion, weighting of the near portion, weighting of the progression portion, weighting dynamics, focuses of use of the spectacle lens, parameters specifying the position of the distance, near and/or progression portions, spatial position of the distance and/or one or more near reference or design points, parameters specifying the course of the object distance function, parameters determining the course of one or more target isoastigmatism lines, and one or more maximally admissible aberrations.

10. A device for calculating design parameters $D^j$, j=1, ..., M of a progressive spectacle lens design and manufacturing the progressive spectacle lens, comprising:
   electronic memory configured to store:
      data of a predetermined design polygon, wherein each point P within the predetermined design polygon defines one design, and the design is characterized at the point P by design values $D^j(P)$, and
      $D^j(P_{Corner})$, j=1, ..., M of the design parameters that characterize the design at the respective corner point $P_{Corner}$ of the predetermined design polygon;
   a specifying unit configured to specify a point $P_{Design}$ within the predetermined design polygon, wherein the point $P_{Design}$ defines the spectacle lens design;
   a calculating unit configured to calculate the value $D^j(P_{Design})$ of each design parameter $D^j$, j=1, ..., M, of the spectacle lens design at the point $P_{Design}$ by an interpolation of the design values $D^j(P_{Corner})$, j=1, ..., M at the respective corner points $P_{Corner}$, and to calculate a spatial distribution of target values of at least one imaging property or aberration of the progressive spectacle lens, the progressive spectacle lens design comprises target values for the spatial distribution of the at least one imaging property or aberration of the progressive spectacle lens; and
   a machine configured to manufacture the progressive spectacle lens in accordance with the spectacle lens design.

11. The method according to claim 1, further comprising: calculating a design of the progressive spectacle lens on the basis of the determined design parameters.

12. The method according to claim 11, further comprising modifying the calculated design by at least one of an interactive dialogue with a user, automatically on the basis of individual data, and preferences of a spectacle wearer.

13. The method according to claim 12, further comprising visualizing the spatial position of the modified design within the predetermined design polygon.

14. The device according to claim 10, further comprising:
   a design calculating unit configured to calculate a design for the progressive spectacle lens on the basis of the determined design parameters.

15. The method according to claim 11, further comprising: calculating the spectacle lens on the basis of the calculated spectacle lens design.

16. The method according to claim 15, wherein the step of calculating the spectacle lens comprises minimizing the target function:

$$F(\vec{x}) = \sum_{i=1}^{m} [g_{i,Ast}(Ast_i - Ast_{i,Target})^2 + ...]$$

wherein
$Ast_{i,Target}$ designates the target value of the local astigmatic deviation or the local astigmatic error at the $i^{th}$ evaluation point, $Ast_i$ designates the actual value of the local astigmatic deviation or the local astigmatic error at the $i^{th}$ evaluation point, and $g_{i,Ast}$ designates the local weighting of the astigmatic deviation or the local astigmatic error at the $i^{th}$ evaluation point.

17. The device according to claim 14, further comprising:
   a design calculating unit configured to calculate the spectacle lens on the basis of the calculated design.

18. A method for visualizing a design for a progressive spectacle lens on the basis of a predetermined design polygon and manufacturing the progressive spectacle lens in accordance with the spectacle lens design, the method comprising:
   specifying design parameters or values of the design parameters of the design to be visualized; $P_{Design}$ within the predetermined design polygon, which corresponds to the predetermined combination of design parameters or the values of the design parameters of the design to be visualized;
   visualizing the spatial position of the determined point $P_{Design}$, which defines the design, within the predetermined design polygon;
   determining a spatial distribution of target values of at least one imaging property or aberration of the progressive spectacle lens,
   wherein
      each point P within the predetermined design polygon defines one design that is characterized by design values $D^j(P)$,
      predetermined design values $D^j(P_{Corner})$, j=1, ..., M of the design parameters characterize the design at the respective corner points $P_{Corner}$ of the predetermined design polygon,
      predetermined values $D^j(P_{Addition})$ of the design parameters characterize the design at the at least one additional point $P_{Addition}$ within the predetermined design polygon,
      M designates the number of design parameters, and
      the progressive spectacle lens design comprises target values for spatial distribution of the at least one imaging property or aberration of the progressive spectacle lens, and; and
   manufacturing the progressive spectacle lens in accordance with the spectacle lens design.

19. The method according to claim 18, further comprising deciding, depending on the visualized spatial position of the determined point $P_{Design}$ of the design, whether the design can be accepted without modification or whether the design has to be modified.

20. The method according to claim 19, wherein the design parameters of the design to be visualized comprise weightings $g_n$, n=1, ..., N of each of the designs in the corner points $P_{Corner}$, and wherein the vertical distances $a_n$, n=1, ..., N of the point to be determined $P_{Design}$ from the respective side edge of the predetermined design polygon are calculated according to the formula:

$$a_n = \frac{k}{\sum_{n=1}^{N} g_n} g_n, n = 1 \ldots N$$

wherein:
k is a predetermined number and preferably k=100 holds.

21. A device for visualizing a design for a progressive spectacle lens and manufacturing the progressive spectacle lens, comprising:
  electronic memory configured to store:
    data of a predetermined design polygon, wherein each point P within the predetermined design polygon defines one design, and the design is characterized at the point P by design values $D^j(P)$, and
    $D^j(P_{Corner})$, j=1, . . . , M of the design parameters that characterize the design at the respective corner point $P_{Corner}$ of the predetermined design polygon optionally, values;
  at least one design parameter input portion configured to input design parameters or values of the design parameters of the design to be visualized;
  a calculating unit configured to calculate the spatial position of a point $P_{Design}$ within the predetermined design polygon, wherein the point $P_{Design}$ corresponds to the predetermined combination of design parameters or of the values of the design parameters of the design to be visualized, and to calculate a spatial distribution of target values of at least one imaging property or aberration of the progressive spectacle lens, wherein the progressive spectacle lens design comprises target values for the spatial distribution of the at least one imaging property or aberration of the progressive spectacle lens;
  at least one display portion configured to visualize the calculated position of the determined point $P_{Design}$ within the predetermined design polygon; and
  a machine configured to manufacture the progressing spectacle lens in accordance with the spectacle lens design.

22. The method according to claim 1, further comprising:
  determining the value $D^j(P_{Design})$ of each design parameter $D^j$, j=1, . . . , M, of the spectacle lens design at the point $P_{Design}$ by an interpolation of one or more predetermined values $D^j(P_{Addition})$ of the design parameter $D^j$ at at least one additional point $P_{Addition}$;
  wherein predetermined values $D^j(P_{Addition})$ of the design parameters characterize the design at the at least one additional point $P_{Addition}$ within the predetermined design polygon.

23. The device according to claim 10,
  wherein the electronic memory is further configured to store values $D^j(P_{Addition})$ of the design parameters that characterize the design at at least one additional point $P_{Addition}$ within the predetermined design polygon, and
  wherein the calculating unit is further configured to calculate the value $D^j(P_{Design})$ of each design parameter $D^j$, j=1, . . . , M, of the spectacle lens design at the point $P_{Design}$ by an interpolation of the values $D^j(P_{Addition})$ of the design parameter $D^j$ at the at least one additional point $P_{Addition}$.

24. The device according to claim 21,
  wherein the electronic memory is further configured to store values $D^j(P_{Addition})$ of the design parameters that characterize the design at at least one additional point $P_{Addition}$ within the predetermined design polygon.

* * * * *